US010727981B2

(12) United States Patent
Gao et al.

(10) Patent No.: US 10,727,981 B2
(45) Date of Patent: Jul. 28, 2020

(54) UPLINK CONTROL INFORMATION TRANSMISSION METHOD AND UPLINK CONTROL INFORMATION TRANSMISSION DEVICE

(71) Applicant: CHINA ACADEMY OF TELECOMMUNICATIONS TECHNOLOGY, Beijing (CN)

(72) Inventors: Xuejuan Gao, Beijing (CN); Yanping Xing, Beijing (CN); Yanan Lin, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/748,629

(22) PCT Filed: Jun. 14, 2016

(86) PCT No.: PCT/CN2016/085737
§ 371 (c)(1),
(2) Date: Jan. 29, 2018

(87) PCT Pub. No.: WO2017/016337
PCT Pub. Date: Feb. 2, 2017

(65) Prior Publication Data
US 2019/0007171 A1 Jan. 3, 2019

(30) Foreign Application Priority Data

Jul. 29, 2015 (CN) .......................... 2015 1 0455257

(51) Int. Cl.
*H04L 1/08* (2006.01)
*H04L 1/16* (2006.01)
(Continued)

(52) U.S. Cl.
CPC ............. *H04L 1/08* (2013.01); *H04L 1/1671* (2013.01); *H04L 1/1854* (2013.01);
(Continued)

(58) Field of Classification Search
None
See application file for complete search history.

(56) References Cited

U.S. PATENT DOCUMENTS

2009/0196247 A1   8/2009 Fan et al.
2009/0290570 A1  11/2009 Kishiyama et al.
(Continued)

FOREIGN PATENT DOCUMENTS

CN   102098146 A   6/2011
CN   102377535 A   3/2012
(Continued)

OTHER PUBLICATIONS

LG Electronics, "Details on SR repetition and SRS transmission for MTC UE"; 3GPP TSG RAN WGI Meeting #81; RI-152705; Fukuoaka, Japan, May 25-29, 2015; pp. 1-4.
(Continued)

*Primary Examiner* — Kodzovi Acolatse
(74) *Attorney, Agent, or Firm* — Ladas & Parry, LLP

(57) ABSTRACT

A UCI transmission method and a UCI transmission device are provided. A subframe set in which UCI repetition is to be transmitted are determined. If an ACK/NACK and an SR are to be transmitted in a certain subframe in the subframe set, one kind of the UCI is selected from the ACK/NACK and the SR to be transmitted in the certain subframe, and then the selected UCI is transmitted in the certain subframe.

17 Claims, 5 Drawing Sheets

(51) Int. Cl.
  *H04L 1/18* (2006.01)
  *H04W 72/04* (2009.01)
  *H04L 5/00* (2006.01)
(52) U.S. Cl.
  CPC .......... *H04L 1/1858* (2013.01); *H04L 5/0055* (2013.01); *H04W 72/04* (2013.01); *H04W 72/0413* (2013.01)

(56) References Cited

U.S. PATENT DOCUMENTS

| | | | | |
|---|---|---|---|---|
| 2009/0316811 | A1* | 12/2009 | Maeda | H04W 76/11 375/260 |
| 2011/0243066 | A1* | 10/2011 | Nayeb Nazar | H04L 1/007 370/328 |
| 2012/0320826 | A1* | 12/2012 | Kim | H04J 13/16 370/328 |
| 2013/0121301 | A1 | 5/2013 | Kim et al. | |
| 2013/0215807 | A1* | 8/2013 | Yang | H04L 1/0026 370/281 |
| 2013/0235768 | A1* | 9/2013 | Earnshaw | H04L 1/1671 370/280 |
| 2013/0272258 | A1* | 10/2013 | Lee | H04B 7/0413 370/329 |
| 2014/0314034 | A1 | 10/2014 | Yang et al. | |
| 2015/0131564 | A1* | 5/2015 | Seo | H04W 72/04 370/329 |
| 2016/0094996 | A1* | 3/2016 | Xiong | H04W 4/70 370/329 |
| 2016/0218836 | A1* | 7/2016 | Yamamoto | H04L 1/1671 |
| 2016/0242169 | A1* | 8/2016 | Park | H04W 4/70 |
| 2016/0262182 | A1* | 9/2016 | Yang | H04W 4/70 |

FOREIGN PATENT DOCUMENTS

| | | |
|---|---|---|
| CN | 102651911 A | 8/2012 |
| CN | 103384183 A | 11/2013 |
| JP | 2008193438 A | 8/2008 |
| JP | 2011514727 A | 5/2011 |
| WO | 2011085230 A2 | 7/2011 |
| WO | 2012015217 A2 | 2/2012 |

OTHER PUBLICATIONS

INTEL Corporation, "CSI measurements and UCI transmission for MTC"; 3GPP TSG RAN WGI Meeting #81; RI-153187; Fukuoaka, Japan, May 25-29, 1015; pp. 1-4.
International Preliminary Report on Patentability (Chapter I) for PCT/CN2016085737 dated Jan. 30, 2018 and its English translation from WIPO.
International Search Report for PCT/CN2016085737 dated Aug. 31, 2016 and its English translation from WIPO.
Written opinion of the International Searching Authority for PCT/CN2016085737 dated Aug. 31, 2016 and its English translation from WIPO.
From TW105119390, Office action dated Aug. 11, 2017 with machine English translated provided by client.
Extended European Search Report for EP 16829704.2 dated Aug. 17, 2018.
Xia, Shuqiang et al., "Carrier Aggregation in LTE-Advanced Systems", ZTE Technology Journal., vol. 17, No. 5., Oct. 31, 2011.
Bratislava, Slovakia: "Joint transmission of ACK/NACK and SR or CSI with PUCCH format 3 and channel selection", 3GPP TSG-RAN Meeting#52, Jul. 3, 2011, XP050537203.
First Office Action from Cn app. No. 201510455257.0, dated Mar. 28, 2019, with machine English translation provided by Global Dossier.
Notification of Reasons for Refusal from JP app. No. 2018-504635, dated Feb. 5, 2019, with machine English translation provided by JPO.
"Silmultaneous PUSCH and PUCCH Transmissions", 3GPP TSG RAN WG1 #63, Jacksonville, USA, Nov. 15-19, 2010.

* cited by examiner

UPLINK CONTROL INFORMATION TRANSMISSION METHOD AND UPLINK CONTROL INFORMATION TRANSMISSION DEVICE

CROSS-REFERENCE TO RELATED APPLICATIONS

The present application is the U.S. national phase of PCT Application PCT/CN2016/085737 filed on Jun. 14, 2016 which claims the priority to Chinese patent application No. 201510455257.0 filed on Jul. 29, 2015, the disclosures of which are incorporated herein by reference in their entireties.

TECHNICAL FIELD

The present disclosure relates to the field of wireless communication technology, in particular to an uplink control information (UCI) transmission method and a UCI transmission device.

BACKGROUND

With the rise of the Internet of Things (JOT), more and more attentions have been paid to a function of supporting Machine Type Communication (MTC) in a Long Term Evolution (LTE) system. An MTC device (MTCT terminal) may have a part of Machine-to-Machine (M2M) communication characteristics, e.g., low mobility, small transmission data volume, being insensitive to communication time delay, and extremely low power consumption. In order to reduce the cost of the MTCT User Equipment (UE), a new type of UE has been defined, so as to merely support a radio frequency bandwidth of 1.4 MHz for both uplink and downlink transmission.

In a conventional network, for the UE operating at some scenarios, e.g., in the basement, in a shopping mall or at a corner of a building, serious attenuation may occur for a wireless signal since the wireless signal is shielded seriously, and at this time the UE cannot be communicate with the network due to serious signal attenuation. In these scenarios, the provision of in-depth coverage of the network may remarkably increase the cost of networking. In order to achieve the coverage enhancement, as a feasible method, a repetition transmission technique or the like may be adopted for a channel. For example, UCI repetition may be transmitted so as to enhance the coverage.

The UCI includes ACKnowledgement/Non-ACKnowledgement (ACK/NACK), Channel State Information (CSI) and Scheduling Request (SR).

An ACK/NACK transmission subframe is determined in accordance with a feedback sequence, and an SR transmission subframe is a pre-configured periodic subframe. Hence, during transmitting the data to enhance the coverage, in a time period where one kind of the UCI repetition is transmitted, another kind of UCI repetition may be transmitted at a certain time point, i.e., collision may occur for the two kinds of UCI.

Currently, there is no effective scheme to prevent the collision of the ACK/NACK with the SR during the repetition transmission.

SUMMARY

An object of the present disclosure is to provide a UCI transmission method and a UCI transmission device, so as to transmit the UCI.

In one aspect, the present disclosure provides in some embodiments a UCI transmission method, including steps of: determining a subframe set in which UCI repetition is to be transmitted, the UCI including an ACK/NACK and an SR; if the ACK/NACK and the SR are determined to be transmitted in a certain subframe in the subframe set, selecting one kind of the UCI from the ACK/NACK and the SR to be transmitted in the certain subframe in accordance with a UCI selection rule; and transmitting the selected UCI in the certain subframe.

In another aspect, the present disclosure provides in some embodiments a UCI transmission method, including steps of: receiving subframes including a first substrate, the certain subframe being an ACK/NACK transmission subframe and an SR transmission subframe, UCI to be transmitted in the certain subframe including one of an ACK/NACK and an SR in accordance with a UCI selection rule; and acquiring the UC from the ACK/NACK transmission subframe and/or the SR transmission subframe of the received subframes in accordance with the UCI selection rule used by a UE.

In yet another aspect, the present disclosure provides in some embodiments a UE, including: a determination module configured to determine a subframe set in which UCI repetition is to be transmitted, the UCI including an ACK/NACK and an SR; a selection module configured to, if the ACK/NACK and the SR are to be transmitted in a certain subframe, select one kind of the UCI from the ACK/NACK and the SR to be transmitted in the certain subframe in accordance with a UCI selection rule; and a transmission module configured to transmit the selected UCI in the certain subframe.

In still yet another aspect, the present disclosure provides in some embodiments a base station, including: a reception module configured to receive subframes including a first substrate, the certain subframe being an ACK/NACK transmission subframe and an SR transmission subframe, UCI to be transmitted in the certain subframe including one of an ACK/NACK and an SR in accordance with a UCI selection rule; and an acquisition module configured to acquire the UCI from the ACK/NACK transmission subframe and/or the SR transmission subframe of the received subframes in accordance with the UCI selection rule used by a UE.

According to the embodiments of the present disclosure, the subframe set in which the UCI repetition is to be transmitted is determined, and if the ACK/NACK and the SR are to be transmitted in the certain subframe, one kind of the UCI is selected from the ACK/NACK and the SR to be transmitted in the certain subframe, and then the selected UCI is transmitted in the certain subframe. For the UE where the data repetition transmission is to be performed, if the collision of the ACK/NACK with the SR occurs in an identical subframe, merely one kind of the UCI selected from the ACK/NACK and the SR may be transmitted in the subframe. As a result, during the repetition transmission, it is able to, if the collision of the ACK/NACK with the SR occurs, prevent the repetition transmission property from being deteriorated or prevent the occurrence of erroneous transmission due to a repetition transmission jump of the ACK/NACK or the SR thereby to transmit the UCI accurately.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to intentionally reflect any actual scale.

DETAILED DESCRIPTION OF THE EMBODIMENTS

Figure 1A:
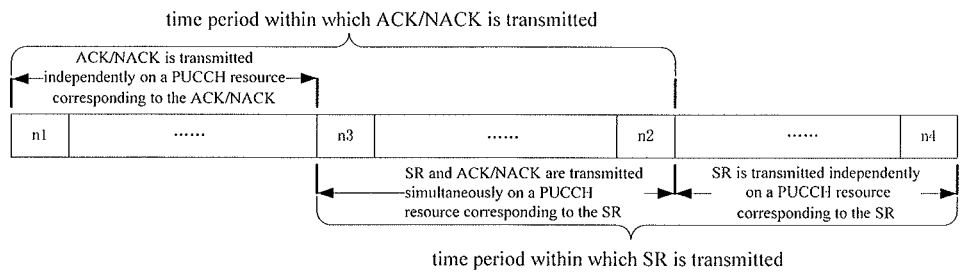
FIGS. 1a and 1b are schematic views showing the repetition transmission of an SR in a related art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall in the scope of the present disclosure.

In an LTE system, an ACK/NACK may be transmitted in a Physical Uplink Control Channel (PUCCH) format 1a/1b, a PUCCH format 1b with channel selection or a PUCCH format 3, and its transmission resource may be an implicit PUCCH resource determined in accordance with a minimum Control Channel Element (CCE)/Enhanced-Control Channel Element (E-CCE), or a semi-static PUCCH resource preconfigured through high-layer signaling. A position of a transmission subframe for the ACK/NACK may be determined in accordance with a predetermined feedback sequence. For a Frequency Division Duplex (FDD) system, a downlink subframe for the feedback of the ACK/NACK in an uplink subframe n is n−4. For a Time Division Duplex (TDD) system, a UE needs to feed back the ACK/NACK for a plurality of downlink subframes in an identical uplink subframe. The number of the downlink subframes for the feedback of the ACK/NACK in the same uplink subframe is defined as M, and M has different values with respect to different uplink subframes and different TDD uplink/downlink configurations. As shown in Table 1, a set of downlink subframes for the feedback of the ACK/NACK in the uplink subframe n include the downlink subframes with a frame number of n−k, where k represents one elements in a set {$k_0$, $k_1$, $k_{M+1}$} corresponding to the uplink subframe n in Table 1. Particularly, for special subframe configurations #0 and #5 using a normal Cyclic Prefix (CP) and special subframe configurations #0 and #4 using an extended CP, no ACK/NACK is fed back in a special subframe, i.e., the set of the downlink subframes corresponding to the uplink subframe n do not include the special subframes.

TABLE 1 index set K ($\{k_0, k_1, \cdots k_{M-1}\}$) of downlink subframes corresponding to uplink subframe in TDD system

| Uplink/ downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 1 shows K corresponding to each uplink subframe by taking a radio frame as an example, where n−k<0 represents a downlink subframe of a previous radio frame.

An SR is transmitted in a PUCCH format 1, its transmission resource is a PUCCH resource preconfigured through the high-layer signaling, its transmission subframes include preconfigured periodic subframes, and a periodicity $SR_{PERIODICITY}$ and a subframe offset value $N_{OFFSET,SR}$ are both indicated by a parameter $I_{SR}$ preconfigured through the high-layer signaling, the correspondence is shown in Table 2. The SR may be transmitted in the uplink subframe determined in accordance with the preconfigured periodicity and the preconfigured subframe offset value. However, for the UE, the SR is not necessarily transmitted each time in these subframes, and whether or not to transmit the SR depends on whether or not the UE has been triggered to transmit the SR, i.e., whether or not uplink data is to be transmitted from the UE and whether or not the UE has requested to schedule uplink resources. Hence, a base station may accurately determine the uplink subframe for the transmission of the ACK/NACK by the UE in accordance with a subframe in which a downlink service is scheduled, so as to receive the ACK/NACK in the subframe. However, it is impossible for the base station to determine the uplink subframe in which the SR is actually transmitted by the UE, and at this time, the base station needs to monitor an SR PUCCH channel in the periodic SR subframes, and then determines whether or not the SR has been transmitted from the UE in accordance with whether or not information has received on a PUCCH channel resource corresponding to the SR.

TABLE 2

UE-specific SR periodicity and subframe offset configuration

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

The transmission of the ACK/NACK and the SR on the PUCCH in the same uplink subframe is supported by the conventional LTE system (e.g., Rel-10/11/12). When the PUCCH format 3 is adopted, the ACK/NACK and the SR may be transmitted simultaneously through joint encoding, i.e., a 1-bit SR may be attached in a cascaded manner to a tail of the ACK/NAC and encoded together with the ACK/NACK, and then transmitted in the PUCCH format 3. In this method, it is presumed that the 1-bit SR and the ACK/NACK are jointly encoded in each of the preconfigured periodic SR subframes, no matter whether or not the SR is to be transmitted in the SR subframe. This is because, the base station cannot be determine whether or not the SR is to be transmitted in each SR subframe and thereby cannot determine the number of bits to be actually transmitted from the UE. At this time, it is impossible for the base station to perform a decoding operation accurately. Hence, when the ACK/NACK and the SR are jointly encoded and transmitted in the PUCCH format 3, it is necessary for the base station and the UE to make an agreement on the number of the transmission bits, i.e., the 1-bit SR always exists in each SR subframe (the 1-bit information needs to be generated even if no SR is to be transmitted by the UE).

In the other cases, if the PUCCH format 1b with channel or the PUCCH format 1a/1b is adopted by the UE and the SR is to be transmitted in the subframe for the feedback of the ACK/NACK (i.e., the subframe for the feedback of the ACK/NACK is just the preconfigured periodic SR transmission subframe and the UE is triggered to transmit the SR in the SR transmission subframe), the ACK/NACK may be transmitted on a preconfigured PUCCH resource corresponding to the SR. If the SR is not to be transmitted in the subframe for the feedback of the ACK/NACK (i.e., the subframe for the feedback of the ACK/NACK is not the periodic SR transmission subframe, or the subframe is the periodic SR transmission subframe but the UE is not triggered to transmit the SR in the subframe), the ACK/NACK may be transmitted on the PUCCH resource corresponding to the ACK/NACK in accordance with a transmission scheme adopted by the UE (e.g., the PUCCH format 1b with channel selection or the PUCCH format 1a/1b). If the SR rather than the ACK/NACK is to be transmitted in the preconfigured periodic SR subframe, the SR may be transmitted on the preconfigured PUCCH resource corresponding to the SR in the PUCCH format 1. In other words, when the SR and the ACK/NACK are transmitted simultaneously, the SR is not transmitted actually, and instead, it is implicitly transmitted on the PUCCH resource corresponding to the SR. At this time, the base station may detect, in a blind manner, the PUCCH resources corresponding to the ACK/NACK and the SR, and then determine whether or not the SR and the ACK/NACK have been transmitted simultaneously from the UE.

Figure 1B:
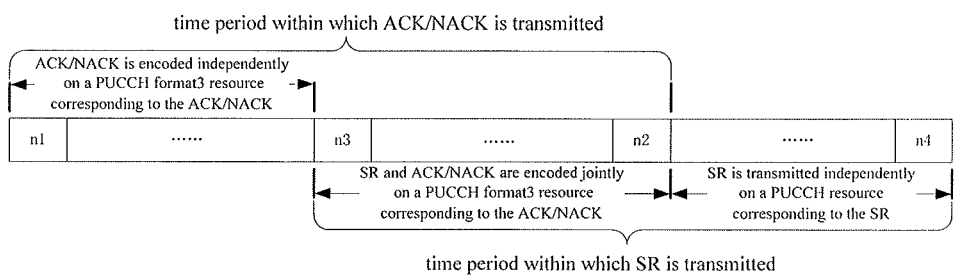

If a conventional transmission scheme where the ACK/NACK and the SR are transmitted in the same subframe is adopted, during the repetition transmission, two different transmission modes are adopted for an identical type of information, so it is impossible to achieve the repetition transmission in a combined manner. For example, assume that the ACK/NACK is to be transmitted from subframe n1 to subframe n2, the SR is to be transmitted in subframe n3 that is between subframe n1 and subframe n2 and the SR is to be transmitted from subframe n3 to subframe n4, in the related art, repetition transmission conditions as shown in FIGS. 1a and 1b may occur. In FIG. 1a, in a repetition transmission time period, the transmission resources for the ACK/NACK have been changed, so it is adverse to the combination of multi-subframe data at a receiving end to obtain a repetition transmission gain. In addition, the SR is transmitted implicitly in a part of a repetition transmission time period and transmitted actually in another part of the repetition transmission time period, so it is also impossible for the receiving end to combine these two parts of information. In FIG. 1b, during the repetition transmission time period, the ACK/NACK has different encoding properties, so it is impossible for the receiving end to perform the combination. In addition, the SR is transmitted implicitly in a part of the repetition transmission time period and transmitted actually in another part of the repetition transmission time period, and the transmission resources for the SR have been changed, so it is also impossible for the receiving end to perform the combination. Hence, the conventional method is not applicable to the UCI repetition transmission.

In order to solve the above-mentioned defects, the present disclosure provides in some embodiments a UCI transmission scheme. The present disclosure will be described hereinafter in more details in conjunction with the drawings and the embodiments.

Figure 2:
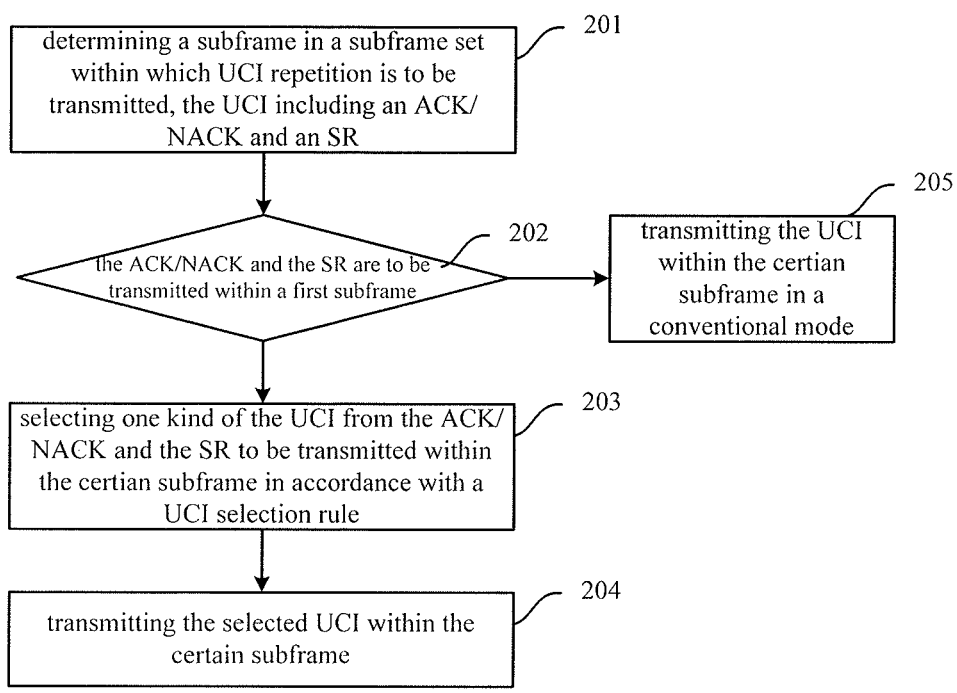
FIG. 2 is a flow chart of a UCI transmission method at a UE side according to at least one embodiment of the present disclosure.

Referring to FIG. 2, the present disclosure provides in some embodiments a UCI transmission method at a UE side. The UE supports the repetition transmission of UCI, and it may be an MTC UE.

As shown in FIG. 2, the method may include the following steps.

Step 201: determining a subframe set in which UCI repetition is to be transmitted, the UCI including an ACK/NACK and an SR.

A position of a transmission subframe for the ACK/NACK is determined in accordance with a predetermined feedback sequence. For an FDD system, a downlink subframe for the feedback of the ACK/NACK in an uplink subframe n is n−4. For a TDD system, the UE needs to feed back the ACK/NACK for a plurality of downlink subframes in an identical uplink subframe. The number of the downlink subframes for the feedback of the ACK/NACK in the same uplink subframe is defined as M, and M has different values with respect to different uplink subframes and different TDD uplink/downlink configurations. As shown in Table 1, a set of downlink subframes for the feedback of the ACK/NACK in the uplink subframe n include the downlink subframes n−k, where k represents one elements in a set $\{k_0, k_1, k_{M+1}\}$ corresponding to the uplink subframe n in Table 1. Particularly, for special subframe configurations #0 and #5 using a normal CP and special subframe configurations #0 and #4 using an extended CP, no ACK/NACK is fed back in a special subframe, i.e., the set of the downlink subframes corresponding to the uplink subframe n do not include the special subframes.

An SR transmission subframe is a preconfigured periodic subframe, and a periodicity $SR_{PERIODICITY}$ and a subframe offset value $N_{OFFSET,SR}$ are both indicated by a parameter $I_{SR}$ through high-layer signaling, the correspondence is shown in Table 2. The SR may be transmitted in the uplink subframe determined in accordance with the preconfigured periodicity and the preconfigured subframe offset value.

Step 202: if the ACK/NACK and the SR are to be transmitted in a certain subframe, proceeding to Step 203.

The certain subframe does not particularly refer to a certain subframe or certain subframes. For clarification, the subframe in which the ACK/NACK and the SR are to be transmitted is called as the certain subframe. In addition, the certain subframe may be one or more subframes, e.g., one or more subframes in which data are to be transmitted.

Step 203: selecting one kind of the UCI from the ACK/NACK and the SR to be transmitted in the certain subframe in accordance with a UCI selection rule. Further, the unselected UCI may be discarded from the ACK/NACK and the SR to be transmitted in the certain subframe.

Further, if the UCI to be transmitted in the certain subframe includes one of the ACK/NACK and the SR in Step 202, it may proceed to Step 205, i.e., the UCI may be transmitted in the certain subframe in a known manner. For example, in the case that the ACK/NACK rather than the SR is to be transmitted in the certain subframe, the ACK/NACK may be transmitted on a PUCCH resource corresponding to the ACK/NACK in the certain subframe using a PUCCH transmission scheme corresponding to the ACK/NACK. If the SR rather than the ACK/NACK is to be transmitted in the certain subframe, the SR may be transmitted on a PUCCH resource corresponding to the SR in the certain subframe using a PUCCH transmission scheme corresponding to the SR.

Step 204: transmitting the selected UCI in the certain subframe.

In Step 204, in a possible embodiment of the present disclosure, if the selected UCI is the ACK/NACK, the ACK/NACK may be transmitted in the certain subframe on the PUCCH resource corresponding to the ACK/NACK using a PUCCH transmission scheme corresponding to the ACK/NACK. For example, the ACK/NACK may be transmitted in a PUCCH format 1a/1b, a PUCCH format 1b with channel selection or a PUCCH format 3. A transmission resource for the ACK/NACK may be an implicit PUCCH resource determined in accordance with a minimum CCE/E-CCE, or a semi-static PUCCH resource preconfigured through high-layer signaling. Further, if the UCI repeated in a subframe preceding the certain subframe is the ACK/NACK, the ACK/NACK may be transmitted in the certain subframe continuously.

In Step 204, in a possible embodiment of the present disclosure, if the selected UCI is the SR, the SR may be transmitted in the certain subframe on a PUCCH resource corresponding to the SR using a PUCCH transmission scheme corresponding to the SR. For example, the SR may be transmitted in a PUCCH format 1, and its transmission resource may be a PUCCH resource preconfigured through high-layer signaling.

As shown in FIG. 2, in the embodiments of the present disclosure, the subframe set in which the UCI repetition is to be transmitted is determined, and if the ACK/NACK and the SR are to be transmitted in the certain subframe, one kind of the UCI is selected from the ACK/NACK and the SR to be transmitted in the certain subframe, and then the selected UCI is transmitted in the certain subframe. For the UE where the data repetition transmission is to be performed, when the collision of the ACK/NACK with the SR occurs in an identical subframe, merely one kind of the UCI selected from the ACK/NACK and the SR may be transmitted in the subframe. As a result, during the repetition transmission, it is able to, when the collision of the ACK/NACK with the SR occurs, prevent the repetition transmission property from being deteriorated or prevent the occurrence of erroneous transmission due to a repetition transmission jump of the ACK/NACK or the SR thereby to transmit the UCI accurately.

The implementation of Step 203, i.e., the UCI selection rule and Step 203 of selecting one kind of the UCI from the ACK/NACK and the SR to be transmitted in the certain subframe in accordance with the UCI selection rule, will be described hereinafter.

In the embodiments of the present disclosure, the UCI selection rule may include one or more of the following rules 1 to 5.

Furthermore, the UCI selection rule may further include information about the use of a certain rule under a certain condition. For example, when a start subframe in which the ACK/NACK is transmitted is the same with a start subframe in which the SR is transmitted, the UCI selection rule may include information about the use of a certain rule or certain rules for the selection of the UCI.

The UCI selection rule may be pre-stored in the UE, or preconfigured by a base station for the UE through high-layer signaling.

Rules 1 to 5 and possible combinations thereof will be described hereinafter.

(1) Rule 1

According to rule 1, the ACK/NACK may always be selected from the ACK/NACK and the SR. In this case, it may also be deemed that the ACK/NACK has a priority level higher than the SR.

(2) Rule 2

According to rule 2, the SR may be always selected from the ACK/NACK and the SR. In this case, it may also be deemed that the SR has a priority level higher than the ACK/NACK.

(3) Rule 3

According to rule 3, one kind of the UCI may be selected from the ACK/NACK and the SR in accordance with priority of the ACK, the NACK and the SR. In a possible embodiment of the present disclosure, the ACK has a priority level higher than the SR, and the SR has a priority level higher than the NACK.

When rule 3 is adopted and the UE determines that the ACK is to be transmitted in the certain subframe, the ACK/NACK may be selected from the ACK/NACK and the SR to be transmitted in the certain subframe, otherwise the SR may be selected from the ACK/NACK and the SR to be transmitted in the certain subframe.

When rule 3 is adopted and the NACK is to be transmitted in the certain subframe, the SR may be selected from the ACK/NACK and the SR to be transmitted in the certain subframe.

(4) Rule 4

According to rule 4, one kind of the UCI may be selected from the ACK/NACK and the SR in accordance with a type of the UCI repeated in a subframe preceding the certain subframe.

To be specific, the UCI of a type identical to the UCI repeated in the subframe preceding the certain subframe may be selected from the ACK/NACK and the SR to be transmitted in the certain subframe.

For example, if the UCI repeated in the subframe preceding the certain subframe is the ACK/NACK, the ACK/NACK may be selected from the ACK/NACK and the SR to be transmitted in the certain subframe, or if the UCI repeated in the subframe preceding the certain subframe is the SR, the SR may be selected from the ACK/NACK and the SR to be transmitted in the certain subframe.

(5) Rule 5

According to rule 5, one kind of the UCI may be selected from the ACK/NACK and the SR in accordance with a first number of transmission times and/or a second number of transmission times of the UCI, the first number of transmission times may be a number of repetition transmission times of the UCI in subframes preceding the certain subframe, and the second number of transmission times may be a total number of repetition transmission times of the UCI.

The first number of transmission times of the UCI includes a first number of transmission times of the ACK/NACK and a first number of transmission times of the SR. The second number of transmission times of the UCI includes a second number of transmission times of the ACK/NACK and a second number of transmission times of the SR. The total number of repetition transmission times of the UCI may be preconfigured, or notified by the base station through high-layer signaling.

In a possible embodiment of the present disclosure, when rule 5 is adopted and if a ratio of the first number of transmission times to the second number of transmission times of the UCI in subframe preceding the certain subframe is greater than a first threshold, the UCI of a type identical to the UCI repeated in subframe preceding the certain subframe may be selected from the ACK/NACK and the SR to be transmitted in the certain subframe, and otherwise the UCI of a type different from the UCI repeated in subframe preceding the certain subframe may be selected from the ACK/NACK and the SR to be transmitted in the certain subframe.

For example, if the UCI repeated in subframe preceding the certain subframe is the SR and a ratio of the first number of transmission times of the SR to the second number of transmission times of the SR is greater than the first threshold, the SR may be selected from the ACK/NACK and the SR to be transmitted in the certain subframe, and otherwise the ACK/NACK may be selected from the ACK/NACK and the SR to be transmitted in the certain subframe. In this way, it is able to report the ACK/NACK as possible while transmitting the SR, thereby to ensure the data reception by the UE. The first threshold may be determined in accordance with the practical need or system performance.

For another example, if the UCI repeated in subframe preceding the certain subframe is the NACK and the first number of transmission times of the NACK to the second number of transmission times of the NACK is greater than the first threshold, the NACK may be selected from the NACK and the SR to be transmitted in the certain subframe, and otherwise the SR may be selected from the NACK and the SR to be transmitted in the certain subframe. In this way, it is able to transmit the SR as possible while reporting the ACK/NACK, thereby to report the scheduling request to a network side as possible while ensuring the data reception by the UE. The first threshold may be determined in accordance with the practical need or system performance.

For yet another example, if the UCI repeated in subframe preceding the certain subframe is the ACK and a ratio of the first number of transmission times of the ACK to the second number of transmission times of the ACK is greater than the first threshold, the ACK may be selected from the ACK and the SR to be transmitted in the certain subframe, and otherwise the SR may be selected from the ACK and the SR to be transmitted in the certain subframe. In this way, it is able to ensure the transmission of the ACK as possible, thereby to enable the base station to transmit more downlink data to the UE.

In a possible embodiment of the present disclosure, when rule 5 is adopted, the type of the UCI having a larger second number of transmission times may be selected in accordance with the second number of transmission times of the ACK/NACK and the second number of transmission times of the SR, and the UCI of a type identical to the selected type of the UCI may be selected from the ACK/NACK and the SR to be transmitted in the certain subframe.

For example, if the total number of repetition transmission times of the ACK/NACK is greater than the total number of repetition transmission times of the SR, the ACK/NACK may be selected from the ACK/NACK and the SR to be transmitted in the certain subframe. In this way, it is able to ensure the repetition transmission times of the ACK/NACK as possible.

In a possible embodiment of the present disclosure, when rule 5 is adopted, the type of the UCI having a smaller second number of transmission times may be selected in accordance with the second number of transmission times of the ACK/NACK and the second number of transmission times of the SR, and the UCI of a type identical to the selected type of the UCI may be selected from the ACK/NACK and the SR to be transmitted in the certain subframe.

For example, if the total number of repetition transmission times of the ACK/NACK is smaller than the total number of repetition transmission times of the SR, the SR may be selected from the ACK/NACK and the SR to be transmitted in the certain subframe.

Rules 1 to 5 may be adopted separately, or in combination. Some of the possible combination modes will be given as follows.

Combination mode 1 where both rule 3 and rule 5 are adopted

In this mode, if the UCI repeated in subframe preceding the certain subframe is the ACK and the ratio of the first number of transmission times of the ACK to the second number of transmission times of the ACK is greater than the first threshold, the ACK/NACK may be selected from the ACK/NACK and the SR to be transmitted in the certain subframe, and otherwise the SR may be selected from the ACK/NACK and the SR to be transmitted in the certain subframe.

In this way, when a ratio of a number of times of the ACK that has been transmitted to the total number of repetition transmission times of the ACK is relatively large and the UCI repeated in subframe preceding the certain subframe is the ACK, the ACK/NACK may be transmitted and the SR may be discarded in the certain subframe, so as to transmit the ACK more times, thereby to enable the base station to transmit more downlink data to the UE. In the other cases, e.g., when the ratio of the number of times of the ACK that has been transmitted to the total number of repetition transmission times of the ACK is relatively small and a ratio of a number of times of the NACK that has been transmitted to the total number of repetition transmission times of the NACK is relatively large, it is still unable for the base station to obviously improve the downlink transmission effect even if the ACK/NACK is transmitted and the SR is discarded in the certain subframe. At this time, the SR may be transmitted and the ACK/NACK may be discarded in the certain subframe, so as to ensure the transmission of the SR.

Combination mode 2 where both rule 3 and rule 4 are adopted

In this mode, if the UCI repeated in subframe preceding the certain subframe is the SR and the ACK is to be transmitted in the certain subframe, the ACK/NACK may be selected from the ACK/NACK and the SR to be transmitted in the certain subframe, and otherwise, the UCI having a type identical to a type of the UCI repeated in subframe preceding the certain subframes may be selected from the ACK/NACK and the SR to be transmitted in the certain subframe.

In this way, the ACK is to be transmitted in the certain subframe. The ACK has the highest priority level, so the ACK/NACK may be transmitted and the SR may be discarded in the certain subframe even if the UCI repeated in subframe preceding the certain subframe is the SR, so as to enable the base station to transmit more downlink data to the UE. In the other cases, e.g., when the UCI repeated in subframe preceding the certain subframe is the SR and the NACK is to be transmitted in the certain subframe, it is still unable for the base station to obviously improve the downlink transmission effect even if the ACK/NACK is transmitted and the SR is discarded in the certain subframe. At this time, the SR may be transmitted continuously and the ACK/NACK may be discarded in the certain subframe, so as to continuously transmitting the same type of UCI and reduce the processing difficulty at the base station side, thereby to prevent the repetition transmission performance from being deteriorated or ensure the accurate transmission.

Further, if a certain subframe in which the ACK/NACK is transmitted is identical to a certain subframe in which the SR is transmitted, the UCI may be transmitted in the subframe in accordance with one of rules 1, 2, 3 and 5. In other words, the ACK/NACK may be transmitted and the SR may be discarded; or the SR may be transmitted and the ACK/NACK may be discarded; or if the ACK/NACK is the ACK, the ACK/NACK may be selected and otherwise the SR may be selected; or the UCI having a larger total number of repetition transmission times may be selected; or the UCI having a smaller total number of repetition transmission times may be selected. Particularly, when the start subframe in which the ACK/NACK is transmitted is identical to the start subframe in which the SR is transmitted and the total number of repetition transmission times of the ACK/NACK is identical to the total number of repetition transmission times of the SR, the two kinds of UCI may be transmitted simultaneously using a known transmission scheme.

Figure 3:
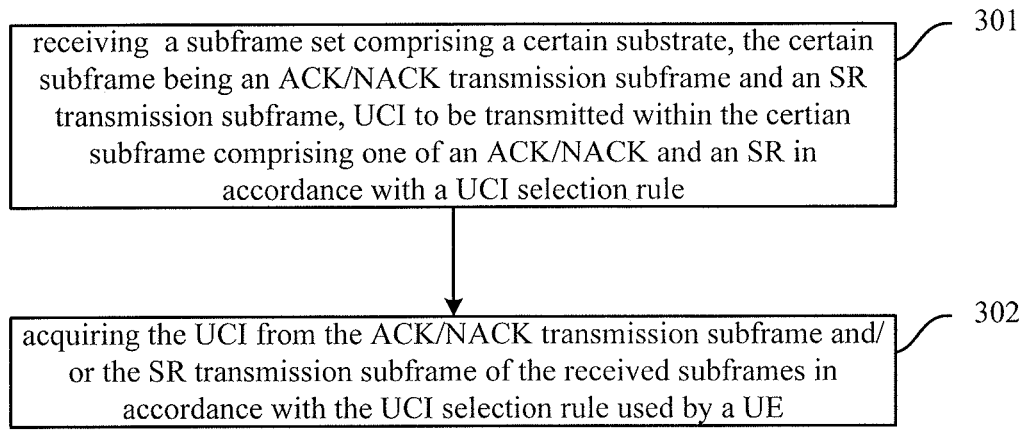
FIG. 3 is a flow chart of a UCI transmission method at a base station side according to at least one embodiment of the present disclosure.

Referring to FIG. 3, the present disclosure provides in some embodiments a UCI transmission method at a base station side.

As shown in FIG. 3, the UCI transmission method may include the following steps.

Step 301: receiving subframes including a first substrate. The certain subframe is an ACK/NACK transmission subframe and an SR transmission subframe, and UCI to be transmitted in the certain subframe includes one of an ACK/NACK and an SR in accordance with a UCI selection rule.

The certain subframe does not particularly refer to a certain subframe or certain subframes. For clarification, the subframe in which the ACK/NACK and the SR are to be transmitted is called as the certain subframe. In addition, the certain subframe may be one or more subframes.

In a possible embodiment of the present disclosure, if the UCI to be transmitted in the certain subframe is the ACK/NACK, the ACK/NACK may be transmitted on a PUCCH resource corresponding to the ACK/NACK in the certain subframe using a PUCCH transmission scheme corresponding to the ACK/NACK. If the UCI to be transmitted in the certain subframe is the SR, the SR may be transmitted on a PUCCH resource corresponding to the SR in the certain subframe using a PUCCH transmission scheme corresponding to the SR.

The transmission of the UCI in the certain subframe may refer to the above-mentioned UCI transmission method at the UE side.

The UCI selection rule may include one or more of the above-mentioned rules 1 to 5, and it may be pre-stored in a UE or configured by a base station for the UE through high-layer signaling.

Step 302: acquiring the UCI from the ACK/NACK transmission subframe and/or the SR transmission subframe of the received subframes in accordance with the UCI selection rule used by the UE.

Step 302 will be described hereinafter in more details.

If the UCI selection rule adopted by the UE is rule 1, in Step 302, the base station may receive a signal on the PUCCH resource corresponding to the ACK/NACK to be transmitted in the ACK/NACK transmission subframes, and the ACK/NACK transmission subframes include the certain subframe. Then, the base station may perform a combination and parsing operation in accordance with the received signal, so as to acquire the ACK/NACK. Further, if no ACK/NACK is acquired after the combination and parsing operation, the base station may acquire the SR on the PUCCH resource corresponding to the SR in the certain subframe.

If the UCI selection rule adopted by the UE is rule 2, in Step 302, the base station may receive a signal on the PUCCH resource corresponding to the SR in the SR transmission subframes, and the SR transmission subframes include the certain subframe. Then, the base station may perform a combination and parsing operation in accordance with the received signal, so as to acquire the SR. Further, if no SR is acquired after the combination and parsing operation, the base station may acquire the ACK/NACK on the PUCCH resource corresponding to the ACK/NACK in the certain subframe.

If the UCI selection rule adopted by the UE is rule 3, in Step 302, one of the following three schemes may be used.

First Scheme

The base station may receive a signal on the PUCCH resource corresponding to the ACK/NACK in the ACK/NACK transmission subframes and perform a combination and parsing operation in accordance with the received signal. The ACK/NACK transmission subframes include the certain subframe. Next, the base station may receive a signal on the PUCCH resource corresponding to the SR in the SR transmission subframes and perform a combination and parsing operation in accordance with the received signal. The SR transmission subframes include the certain subframe. If the ACK is acquired in accordance with a combination and parsing result of the ACK/NACK, the base station may determine that the UCI is the ACK and no SR is transmitted from the UE, no matter whether or not the SR is acquired in accordance with a combination and parsing result of the SR. If the NACK is acquired in accordance with the combination and parsing result of the ACK/NACK and a DTX message is acquired in accordance with the combination and parsing result of the SR, the base station may determine that the UCI is the NACK and no SR is transmitted from the UE. If the NACK is acquired in accordance with the combination and parsing result of the ACK/NACK and the SR is acquired in accordance with the combination and parsing result of the SR, the base station may determine that the UCI is the SR.

Second Scheme

The base station may receive a signal on the PUCCH resource corresponding to the ACK/NACK in the ACK/NACK transmission subframes and perform a combination and parsing operation in accordance with the received signal, and the ACK/NACK transmission subframes include the certain subframe. Next, the base station may receive a signal on the PUCCH resource corresponding to the SR in the SR transmission subframes and cache the received signal, and the SR transmission subframes include the certain subframe. If no ACK/NACK is acquired in accordance with the combination and parsing result, the base station may perform a combination and parsing operation in accordance with the cached signal.

Third Scheme

The base station may receive a signal on the PUCCH resource corresponding to the ACK/NACK in the ACK/NACK transmission subframes and cache the received signal, and the ACK/NACK transmission subframes include the certain subframe. Next, the base station may receive a signal on the PUCCH resource corresponding to the SR in the SR transmission subframes and perform a combination and parsing operation in accordance with the received signal, and the SR transmission subframes include the certain subframe. If no SR is acquired in accordance with the combination and parsing result, the base station may perform a combination and parsing operation in accordance with the cached signal on the PUCCH resource corresponding to the ACK/NACK in the ACK/NACK transmission subframes.

If the UCI selection rule adopted by the UE is rule 4, in Step 302, the base station may receive a signal on the PUCCH resource corresponding to the ACK/NACK in the ACK/NACK transmission subframes and perform a combination and parsing operation, and the ACK/NACK transmission subframes include the certain subframe. Next, the base station may receive a signal on the PUCCH resource corresponding to the SR in the SR transmission subframes and cache the received signal, and the SR transmission subframes include the certain subframe. If no ACK/NACK is acquired in accordance with a combination and parsing result of the ACK/NACK, the base station may perform a combination and parsing operation in accordance with the cached signal on the PUCCH resource corresponding to the SR in the SR transmission subframes.

f the UCI selection rule adopted by the UE is rule 5, in Step 302, the base station may determine a first number of transmission times and a second number of transmission times of the UCI. The first number of transmission times refers to the number of transmission times of the UCI repeated in subframes preceding the certain subframe, and the second number of transmission times refers to the total number of transmission times of the UCI. If a ratio of the first number of transmission times to the second number of transmission times of the UCI is greater than a first threshold, the base station may receive a signal on the PUCCH resource corresponding to the ACK/NACK in the ACK/NACK transmission subframes, and perform a combination and parsing operation in accordance with the received signal so as to acquire the ACK/NACK. The ACK/NACK transmission subframes include the certain subframe. Otherwise, the base station may receive a signal on the PUCCH resource corresponding to the SR in the SR transmission subframes, and perform a combination and parsing operation in accordance with the received signal, so as to acquire the ACK/NACK. The SR transmission subframes include the certain subframe.

According to the embodiments of the present disclosure, since the UE has determined that the ACK/NACK and the SR are to be transmitted in the certain subframe, i.e., the ACK/NACK and the SR are to be transmitted in an identical subframe so that collision occurs, one kind of the UCI is selected from the ACK/NACK and the SR to be transmitted in the certain subframe according to a UCI selection rule, and then the selected UCI is transmitted in the certain subframe. For the UE where the data repetition transmission is to be performed, when the collision of the ACK/NACK with the SR occurs in an identical subframe, merely one kind of the UCI selected from the ACK/NACK and the SR may be transmitted in the subframe. As a result, during the repetition transmission, it is able to, when the collision of the ACK/NACK with the SR occurs, prevent the repetition transmission property from being deteriorated or prevent the occurrence of erroneous transmission due to a repetition transmission jump of the ACK/NACK or the SR thereby to transmit the UCI accurately. Correspondingly, at the base station side, it is able to accurately parse the UCI in accordance with the UCI selection rule adopted by the UE.

For ease of understanding, the UCI transmission method at the base station side will be described hereinafter in more details.

In a possible embodiment of the present disclosure, the base station may transmit downlink data indicating that the ACK/NACK is to be fed back in subframe n1, i.e., the ACK/NACK needs to be transmitted from subframe n1, with a repetition transmission time period from subframe n1 to subframe n2. Subframe n3 between subframe n1 and subframe n2 is an SR transmission subframe.

If there indeed exists the SR transmission in the SR transmission subframe (i.e., there is a positive SR) with a repetition transmission time period from subframe n3 to subframe n4 and the downlink data from the base station has been discarded at the UE side, no ACK/NACK is actually transmitted in subframe n1 to subframe n2. If there exists the SR transmission in the subframes from subframe n3, the SR may be transmitted on the PUCCH resource corresponding to the SR in the subframes from subframe n3 to subframe n4. If the UE has received the downlink data scheduled by the base station, the UE needs to feed back the ACK/NACK in subframe n1. At this time, the UE needs to select one kind of the UCI from the ACK/NACK and the SR to be transmitted in accordance with the UCI selection rule, and transmit the selected UCI in subframe n3 to subframe n2.

The base station cannot determine whether or not the downlink data is lost at the UE (i.e., whether or not the ACK/NACK is fed back in subframe n1) nor determine whether or not there indeed exists the SR transmission in subframe n3. At this time, the base station may receive the UCI in accordance with the UCI selection rule adopted by the UE.

The selection of the UCI in accordance with different UCI selection rules will be described herein in conjunction with several scenarios.

Scenario 1 where the UCI is Selected in Accordance with Rule 1

UCI Transmission Procedure at the UE Side

Figure 4A:
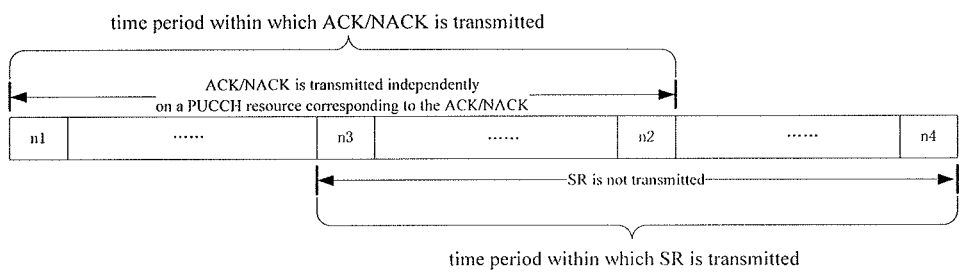
FIGS. 4a and 4b are schematic views showing the UCI transmission method at the UE side according to at least one embodiment of the present disclosure.

As shown in FIG. 4a, the UE may transmit the ACK/NACK on the PUCCH resource corresponding to the ACK/NACK in subframe n1 to subframe n2. If there indeed exists the SR transmission in subframe n3, the UE may discard the SR transmission in subframes n2 to n3 in accordance with rule 1, and transmit the ACK/NACK on the PUCCH resource corresponding to the ACK/NACK. The UE may transmit the SR on the PUCCH resource corresponding to the SR in subframes n3 to n4.

UCI Transmission Procedure at the Base Station Side

The base station may receive a signal on the PUCCH resource corresponding to the ACK/NACK in subframes n1 to n2, and perform a combination and parsing operation so as to acquire the ACK/NACK. Of course, on the basis of the reception of the ACK/NACK, the base station may also receive a signal on the PUCCH resource corresponding to the SR in the subframes from subframe n3. The base station may at first parse the ACK/NACK, and if the ACK/NACK has been acquired, the parsing operation may be ended. If no signal transmission exists on the PUCCH resource corresponding to the ACK/NACK (e.g., the DTX message has been acquired), the base station may determine that the downlink data has been lost at the UE side (i.e., no ACK/NACK has been transmitted in the subframes from subframe n1). At this time, the base station may continue to receive a signal on the PUCCH resource corresponding to the SR and parse the received signal so as to acquire the SR.

If no signal transmission exists on the PUCCH resource corresponding to the SR (i.e., the DTX message has been received), the base station may determine that there exists no real SR transmission in subframe n3.

Scenario 2 where the UCI is Selected in Accordance with Rule 2

UCI Transmission Procedure at the UE Side

Figure 4B:
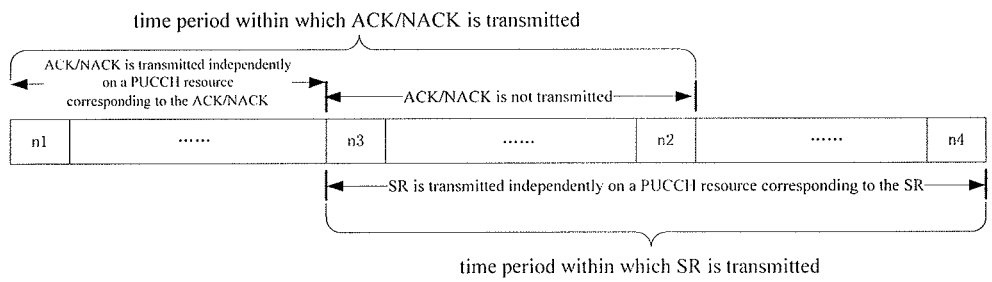

As shown in FIG. 4b, the UE may transmit the ACK/NACK on the PUCCH resource corresponding to the ACK/NACK in the subframes from subframe n1. If there indeed exists the SR transmission in subframe n3, the UE may not transmit the ACK/NACK in subframe n3 in accordance with rule 2, and transmit the SR on the PUCCH resource corresponding to the SR in subframes n3 to n4.

If there exists no SR transmission in subframe n3, the UE may continue to transmit the ACK/NACK on the PUCCH resource corresponding to the ACK/NACK in subframes n3 to n2.

If there exits the SR transmission in subframe n3, the UE may not transmit the ACK/NACK in subframes n1 to n3, and instead, it may directly transmit the SR in subframes n3 to n4.

UCI Transmission Procedure at the Base Station Side

It is supposed that there exists the SR transmission, the base station may receive a signal on the PUCCH resource corresponding to the SR in subframes n3 to n4, and perform a combination and parsing operation so as to acquire the SR. Of course, on the basis of the reception of the SR, the base station may also receive a signal on the PUCCH resource corresponding to the ACK/NACK in the subframes from subframe n1. The base station may at first parse the SR, and if the SR has been acquired, the parsing operation may be ended. If no signal transmission exists on the PUCCH resource corresponding to the SR (e.g., the DTX message has been acquired), the base station may determine that no real SR transmission exists in subframe n3. At this time, the base station may acquire the ACK/NACK on the PUCCH resource corresponding to the ACK/NACK. If there is no signal transmission on the PUCCH resource corresponding to the ACK/NACK (i.e., the DTX message has been received), the base station may determine that the downlink data has been lost at the UE side (i.e., no ACK/NACK is transmitted in the subframes from subframe n1).

Scenario 3 where the UCI is selected in accordance with rule 3

UCI Transmission Procedure at the UE Side

The UE may determine whether or not the ACK/NACK to be transmitted is the ACK. If the ACK is to be transmitted, the UE may transmit the ACK on the PUCCH resource corresponding to the ACK/NACK in subframes n1 to n2. If there indeed exists the SR transmission in subframe n3, the UE may not transmit the SR in accordance with rule 3 (because the ACK has a priority level higher than the SR), as shown in FIG. 4a.

The UE may determine whether or not the ACK/NACK to be transmitted is the NACK. If the NACK is to be transmitted, the UE may transmit the NACK on the PUCCH resource corresponding to the ACK/NACK in subframes n1 to n2. If there indeed exists the SR transmission in subframe n3, the UE may not transmit the NACK in the subframes from subframe n3 and transmit the SR on the PUCCH resource corresponding to the SR (because the SR has a priority level higher than the NACK), as shown in FIG. 4b. If there exists no SR transmission in subframe n3, the UE may continue to transmit the NACK on the PUCCH resource corresponding to the ACK/NACK in subframes n3 to n2.

If there exists the SR transmission in subframe n3, the UE may not transmit the NACK in subframes n1 to n3, and instead, it may directly transmit the SR in the subframes from subframe n3.

UCI Transmission Procedure at the Base Station Side

It is impossible for the base station to determine in advance whether or not the ACK/NACK is the ACK. The base station may acquire the UCI using one of the following schemes.

In a first scheme, the base station may receive a signal on the PUCCH resource corresponding to the ACK/NACK in subframes n1 to n2. Based on this, the base station may further receive a signal on the PUCCH resource corresponding to the SR in subframes n3 to n4. Next, the base station may determine whether or not the information to be transmitted from the UE is the ACK/NACK or the SR in accordance with combination and parsing results acquired in accordance with the received signals. For example, if the ACK is acquired, it may be deemed that the ACK has been actually transmitted from the UE and no SR has been transmitted. If that the NACK is acquired, a parsing result of the SR may be taken into consideration. If the SR is the DTX message, it may be deemed that no SR has been transmitted from the UE and the NACK has been actually transmitted from the UE. If the SR is acquired, it may be deemed that false detection of the NACK occurs, i.e., no ACK/NACK has been transmitted from the UE and the SR has been actually transmitted.

In a second scheme, the base station may receive a signal on the PUCCH resource corresponding to the ACK/NACK in subframes n1 to n2, and cache information received on the PUCCH resource corresponding to the SR in the subframes from subframe n3. If the base station has detected the ACK/NACK after combining the repeated information received on the PUCCH resource corresponding to the ACK/NACK, it may be deemed that the ACK/NACK has been actually transmitted from the UE and no SR has been transmitted. Otherwise, the base station may determine that the downlink data has been lost at the UE (i.e., no ACK/NACK is transmitted in the subframes from subframe n1). The base station may further receive the signal on the PUCCH resource corresponding to the SR and parse the received signal to acquire the SR. If no signal transmission exists on the PUCCH resource corresponding to the SR (i.e., the DTX message has been detected), the base station may determine that no real SR transmission exists in subframe n3.

In a third scheme, the base station may receive a signal on the PUCCH resource corresponding to the ACK/NACK in subframes n1 to n2 and cache the received signal. Next, the base station may receive a signal on the PUCCH resource corresponding to the SR in subframes n3 to n4, and parse the received signal so as to acquire the SR. If the base station has detected the SR after combining the repeated information received on the PUCCH resource corresponding to the SR, it may be deemed that the SR has been transmitted from the UE and no ACK/NACK has been transmitted. Otherwise, the base station may determine that no real SR transmission exists in subframe n3. At this time, the base station may further parse the signal received on the PUCCH resource corresponding to the ACK/NACK so as to acquire the ACK/NACK. If no signal transmission exists on the PUCCH resource corresponding to the ACK/NACK (i.e., the DTX message has been detected), the base station may determine that the downlink data has been lost at the UE (i.e., no ACK/NACK is transmitted in the subframes from subframe n1).

Scenario 4 where the UCI is Selected in Accordance with Rule 4

UCI Transmission Procedure at the UE Side

The UE may transmit the ACK/NACK on the PUCCH resource corresponding to the ACK/NACK in subframes ill to n2. If there indeed exists the SR transmission in subframe n3, the UE may not transmit the SR in subframe n3 (because the start transmission subframe n1 for the ACK/NACK precedes the SR transmission subframe n3), as shown in FIG. 4a.

UCI Transmission Procedure at the Base Station Side

The base station has scheduled the downlink data for the feedback of the ACK/NACK in subframe n1, so it may directly determine that the UE has transmitted the ACK/NACK in subframes n1 to n2, and then directly receive the ACK/NACK on the PUCCH resource corresponding to the ACK/NACK. Of course, the base station may cache a signal received on the PUCCH resource corresponding to the SR in the subframes from subframe n3, and parse the received signal to acquire the ACK/NACK. If the ACK/NACK is acquired, the parsing operation may be ended. If no signal transmission exists on the PUCCH resource corresponding to the ACK/NACK (i.e., the DTX message has been detected), the base station may determine that the downlink data has been lost at the UE (i.e., no ACK/NACK is transmitted in the subframes from subframe n1). At this time, the base station may further receive the signal on the PUCCH resource corresponding to the SR and parse the received signal to acquire the SR. If no signal transmission exists on the PUCCH resource corresponding to the SR (i.e., the DTX message has been detected), the base station may determine that no real SR transmission exists in subframe n3.

Scenario 5 where the UCI is Selected in Accordance with Rule 5

UCI Transmission Procedure at the UE Side

In subframes n1 to n3, the number of repetition transmission times of the ACK/NACK is N, and the total number of repetition transmission times of the ACK/NACK is P. If a ratio of N to P is greater than the first threshold, the UE may not transmit the SR in subframe n3, and transmit the ACK/NACK on the PUCCH resource corresponding to the ACK/NACK. If the ratio of N to P is not greater than the first threshold, the UE may not transmit the ACK/NACK in subframe n3, and transmit the SR on the PUCCH resource corresponding to the SR.

UCI Transmission Procedure at the Base Station Side

If the ratio of N to P is greater than the first threshold, the UCI transmission procedure at the base station side may be identical to that in scenario 1, and otherwise, it may be identical to that in scenario 2, which will not be particularly defined herein. N and P may have meanings identical to those mentioned above.

In a possible embodiment of the present disclosure, subframe n1 is the SR transmission subframe. If there indeed exists the SR transmission in subframe n1, a repetition transmission time period of the SR may be subframes n1 to n2.

If the base station has transmitted the downlink data about the feedback of the ACK/NACK in subframe n3 between subframe n1 and subframe n2 (i.e., the ACK/NACK needs to be transmitted in the subframes from subframe n3 with a repetition transmission time period of subframes n3 to n4) and the downlink data has been discarded at the UE side, the UE may not actually transmit the ACK/NACK in subframes n3 to n4. If there indeed exists the SR transmission in the subframes from subframe n1, the UE may transmit the SR on the PUCCH resource corresponding to the SR in subframes n1 to n2. If the UE has received the downlink data and there exists no SR transmission in subframe n1, the UE may transmit the ACK/NACK on the PUCCH resource corresponding to the ACK/NACK in subframes n3 to n4. If the UE has received the downlink data from the base station and there exists the SR transmission in subframe n1, the UE needs to select one kind of the UCI from the ACK/NACK and the SR in accordance with the above-mentioned UCI selection rule and transmit the selected UCI in subframes n3 to n2.

It is impossible for the base station to determine in advance whether or not the downlink data has been lost at the UE (i.e., whether or not the ACK/NACK is fed back by the UE in subframe n3) nor determine whether or not there indeed exists the SR transmission in subframe n1. At this time, the base station may receive the UCI in accordance with the UCI selection rule adopted by the UE.

Selection results of different selection rules will be described hereinafter in More Details in Conjunction with Several Scenarios.

Scenario 1 where the UCI is selected in accordance with rule 1

UCI Transmission Procedure at the UE Side

Figure 5A:
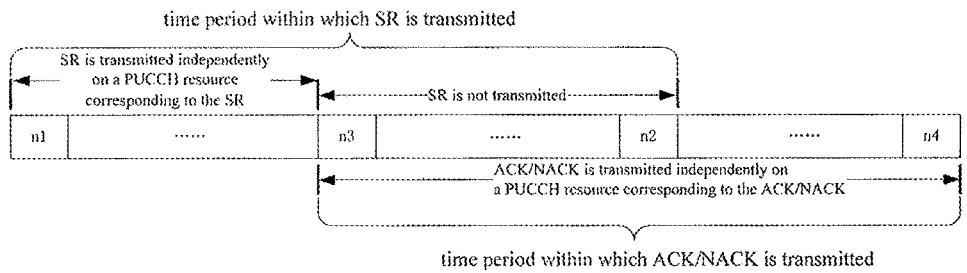
FIGS. 5a and 5b are schematic views showing the UCI transmission method at the base station side according to at least one embodiment of the present disclosure.

The UE may transmit the SR on the PUCCH resource corresponding to the SR in the subframes from subframe n1. Next, the UE may not transmit the ACK/NACK in subframe n3 in accordance with rule 1, and transmit the ACK/NACK on the PUCCH resource corresponding to the ACK/NACK in subframes n3 to n4, as shown in FIG. 5a.

If the UE may determine in the subframe n1 that there exists the ACK/NACK transmission in subframe n3, the UE may also not transmit the SR in subframes n1 to n3, and instead, it may directly transmit the ACK/NACK in the subframes from subframe n3.

UCI Transmission Procedure at the Base Station Side

The base station may receive a signal on the PUCCH resource corresponding to the ACK/NACK in subframes n3 to n4. If there exists the SR transmission, the base station may receive a signal on the PUCCH resource corresponding to the SR in subframes n1 to n2, and cache the received signal. Next, the base station may parse the ACK/NACK at first, and if the ACK/NACK is acquired, the parsing operation may be ended. If there exists no signal transmission on the PUCCH resource corresponding to the ACK/NACK (i.e., the DTX message has been detected after combination), the base station may determine that the downlink data has been lost at the UE (i.e., no ACK/NACK is transmitted in the subframes from subframe n3). At this time, the base station may further perform a combination and parsing operation on the signal received on the PUCCH resource corresponding to the SR, so as to acquire the SR. If there exists no signal transmission on the PUCCH resource corresponding to the SR (i.e., the DTX message has been detected after the combination), the base station may determine that there exists no real SR transmission in subframe n1. Alternatively, the base station may directly determine that there exists the ACK/NACK feedback in subframe n3 (i.e., the ACK/NACK transmission exists in subframes n3 to n4). At this time, the base station may receive the signal on the PUCCH resource corresponding to the ACK/NACK merely in subframes n3 to n4, and combine the received signals to acquire the ACK/NACK (at this time, whether or not there exits the signal transmission on the PUCCH resource corresponding to the SR may not be taken into consideration).

Scenario 2 where the UCI is Selected in Accordance with Rule 2

Figure 5B:
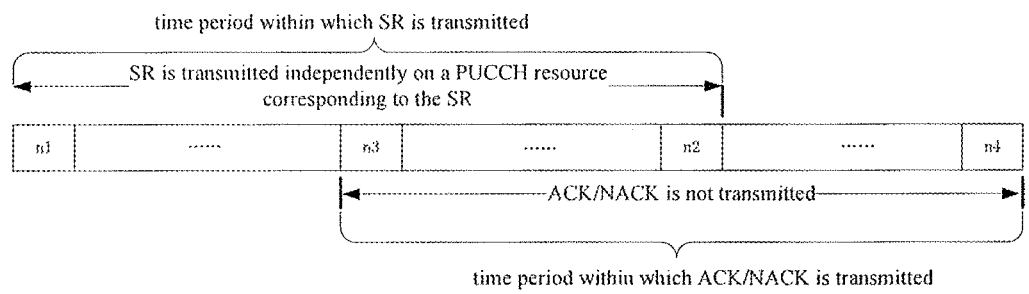

The UE may transmit the SR on the PUCCH resource corresponding to the SR in subframes n1 to n2, as shown in FIG. 5b. This is because the UE may continue to transmit the SR in subframe n3 in accordance with rule 2.

UCI Transmission Procedure at the Base Station Side

It is supposed that there exists the SR transmission, the base station may receive a signal on the PUCCH resource corresponding to the SR in subframes n1 to n2, and perform a combination and parsing operation so as to acquire the SR. Of course, on the basis of the reception of the SR, the base station may further receive a signal on the PUCCH resource corresponding to the ACK/NACK in the subframes from subframe n3. The base station may parse the SR signal at first, and if the SR is acquired, the parsing operation may be ended. If there exists no signal transmission on the PUCCH resource corresponding to the SR (i.e., the DTX message has been detected after the combination), the base station may determine there exists no real SR transmission in subframe n1. At this time, the base station may further perform a combination and parsing operation on the signal received on the PUCCH resource corresponding to the ACK/NACK, so as to acquire the ACK/NACK. If there exists no signal transmission on the PUCCH resource corresponding to the ACK/NACK (i.e., the DTX message has been detected after the combination), the base station may determine that the downlink data has been lost at the UE (i.e., no ACK/NACK is transmitted in the subframes from subframe n3).

Scenario 3 where the UCI is Selected in Accordance with Rule 3

The UE may transmit the SR on the PUCCH resource corresponding to the SR in the subframes from subframe n1. In subframe n3, the UE may determine whether or not the ACK/NACK to be transmitted is the ACK. If the ACK/NACK to be transmitted is the ACK, the UE may not transmit the SR in subframe n3, and instead, it may transmit the ACK on the PUCCH resource corresponding to the ACK/NACK in subframes n3 to n4, as shown in FIG. 5a. If the ACK/NACK to be transmitted is the NACK, the UE may transmit the SR on the PUCCH resource corresponding to the SR in subframes n1 to n2, as shown in FIG. 5b. This is because the UE may not transmit the NACK in accordance with rule 3 (the SR has a priority level higher than the NACK).

If there exists the ACK transmission in subframe n3, the UE may also not transmit the SR transmission in subframes n1 to n3, and transmit the ACK in the subframes from subframe n3.

UCI Transmission Procedure at the Base Station Side

It is impossible for the base station to determine in advance whether or not the ACK/NACK to be transmitted is the ACK. The base station may acquire the UCI using one of the following schemes.

In a first scheme, the base station may receive a signal on the PUCCH resource corresponding to the SR in subframes n1 to n2. Based on this, the base station may further receive a signal on the PUCCH resource corresponding to the ACK/NACK in subframes n3 to n4, and determine whether or not the information to be transmitted from the UE is the ACK/NACK or the SR in accordance with combination and parsing results acquired in accordance with the received signals. For example, if the ACK is acquired, it may be deemed that the ACK has been actually transmitted from the UE and no SR has been transmitted. If the NACK is acquired, a parsing result of the SR may be taken into consideration. If the SR is the DTX message, it may be deemed that no SR has been transmitted from the UE and the NACK has been actually transmitted from the UE. If the SR is acquired, it may be deemed that false detection of the NACK occurs, i.e., no ACK/NACK has been transmitted from the UE and the SR has been actually transmitted.

In a second scheme, the base station may receive a signal on the PUCCH resource corresponding to the SR in subframes n1 to n2, and cache information received on the PUCCH resource corresponding to the ACK/NACK in the subframes from subframe n3. If the base station has detected the SR after combining the repeated information received on the PUCCH resource corresponding to the SR, it may be deemed that the SR has been actually transmitted from the UE and no ACK/NACK has been transmitted. Otherwise, the base station may further parse the information acquired on the PUCCH resource corresponding to the ACK/NACK, so as to acquire the ACK/NACK. If no signal transmission exists on the PUCCH resource corresponding to the ACK/NACK (i.e., the DTX message has been detected), the base station may determine that the downlink data has been lost at the UE (i.e., no ACK/NACK is transmitted in the subframes from subframe n3).

In a third scheme, the base station may receive a signal on the PUCCH resource corresponding to the SR in subframes n1 to n2 and cache the received signal. Meanwhile, the base station may receive a signal on the PUCCH resource corresponding to the ACK/NACK in subframes n3 to n4, and parse the received signal. If no signal transmission exists on the PUCCH resource corresponding to the ACK/NACK (i.e., the DTX message has been detected after the combination), the base station may determine that the downlink data has been lost at the UE (i.e., no ACK/NACK is transmitted in the subframes from subframe n3). At this time, the base station may further perform a combination and parsing operation on the signal received on the PUCCH resource corresponding to the SR so as to acquire the SR. If there exists no signal transmission on the PUCCH resource corresponding to the SR (i.e., the DTX message has been detected after the combination), the base station may determine that there exists no real SR transmission in subframe n1.

Scenario 4 where the UCI is Selected in Accordance with Rule 4

The UE may transmit the SR on the PUCCH resource corresponding to the SR in subframes n1 to n2. Because the start transmission subframe n1 for the SR precedes the ACK/NACK transmission subframe n3, the UE may not transmit the ACK/NACK in subframe n3, as shown in FIG. 5a.

The UCI transmission procedure at the base station side is identical to that in scenario 2, and thus will not be particularly defined herein.

Scenario 5 where the UCI is Selected in Accordance with Rule 5

In subframes n1 to n3, the number of repetition transmission times of the SR is N, and the total number of repetition transmission times of the SR is P. If a ratio of N to P is greater than the first threshold, the UE may not transmit the ACK/NACK in subframes n1 to n2, as shown in FIG. 5b. Otherwise, the UE may transmit the SR on the PUCCH resource corresponding to the SR in subframes n1 to n2, as shown in FIG. 5a.

UCI Transmission Procedure at the Base Station Side

It is supposed that there exists the SR transmission in subframe n1 and the ratio of N to P is greater than the first threshold, the UCI transmission procedure at the base station side may be identical to that in scenario 2, and otherwise, the UCI transmission procedure at the base station side may be identical to that in scenario 1, which will not be particularly defined herein. N and P may have meanings identical to those mentioned above.

Based on an identical inventive concept, the present disclosure further provides in some embodiments a UE and a base station.

Figure 6:
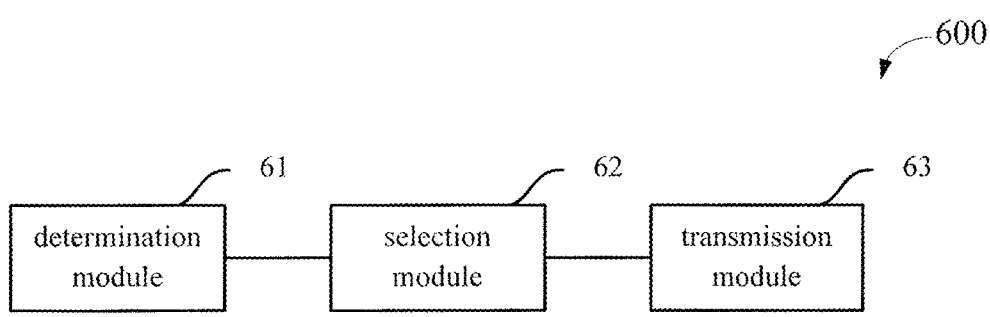
FIG. 6 is a schematic view showing a UE according to at least one embodiment of the present disclosure.

Referring to FIG. 6, the present disclosure provides in some embodiments a UE 600 capable of executing the UCI transmission procedure at the UE side. The UE 600 may include a determination module 61, a selection module 62 and a transmission module 63. The determination module 61 is configured to determine a subframe set in which UCI repetition is to be transmitted. The UCI includes an ACK/NACK and an SR. The selection module 62 is configured to, if the ACK/NACK and the SR are to be transmitted in a certain subframe, select one kind of the UCI from the ACK/NACK and the SR to be transmitted in the certain subframe in accordance with a UCI selection rule. The transmission module 63 is configured to transmit the selected UCI in the certain subframe.

The UCI selection rule include one or more of the above-mentioned rules 1 to 5, which will not be particularly defined herein.

In a possible embodiment of the present disclosure, the selection module 62 may be further configured to, if the ACK/NACK to be transmitted in the certain subframe is the ACK, select the ACK/NACK from the ACK/NACK and the SR to be transmitted in the certain subframe, and otherwise select the SR from the ACK/NACK and the SR to be transmitted in the certain subframe; or if the ACK/NACK to be transmitted in the certain subframe is the NACK, select the SR from the ACK/NACK and the SR to be transmitted in the certain subframe.

In a possible embodiment of the present disclosure, the selection module 62 may be further configured to select, from the ACK/NACK and the SR to be transmitted in the certain subframe, the UCI of a type identical to the UCI repeated in subframe preceding the certain subframe.

In a possible embodiment of the present disclosure, the selection module 62 may be further configured to: if a ratio of the first number of transmission times to the second number of transmission times of the UCI in subframe preceding the certain subframe is greater than a first threshold, select from the ACK/NACK and the SR to be transmitted in the certain subframe the UCI of a type identical to the UCI repeated in subframe preceding the certain subframe, and otherwise select from the ACK/NACK and the SR to be transmitted in the certain subframe the UCI of a type different from the UCI repeated in subframe preceding the certain subframe; or select the type of the UCI having a larger or smaller second number of transmission times in accordance with a second number of transmission times of the ACK/NACK and a second number of transmission times of the SR, and select from the ACK/NACK and the SR to be transmitted in the certain subframe the UCI of a type identical to the selected type of the UCI.

In a possible embodiment of the present disclosure, the selection module 62 may be further configured to, if the UCI repeated in subframe preceding the certain subframe is the ACK and a ratio of the first number of transmission times of the ACK to the second number of transmission times of the ACK is greater than the first threshold, select the ACK/NACK from the ACK/NACK and the SR to be transmitted in the certain subframe, and otherwise select the SR from the ACK/NACK and the SR to be transmitted in the certain subframe.

In a possible embodiment of the present disclosure, the selection module 62 may be further configured to, if the UCI repeated in subframe preceding the certain subframe is the SR and the ACK/NACK to be transmitted in the certain subframe is the ACK, select the ACK/NACK from the ACK/NACK and the SR to be transmitted in the certain subframe, and otherwise select from the ACK/NACK and the SR to be transmitted in the certain subframe the UCI of a type identical to the UCI repeated in subframe preceding the certain subframe.

In a possible embodiment of the present disclosure, the transmission module 63 may be further configured to: if the selected UCI is the ACK/NACK, transmit the ACK/NACK to be transmitted in the certain subframe using a PUCCH transmission scheme corresponding to the ACK/NACK on a PUCCH resource corresponding to the ACK/NACK; or if the selected UCI is the SR, transmit the SR to be transmitted in the certain subframe using a PUCCH transmission scheme corresponding to the SR on a PUCCH resource corresponding to the SR.

Figure 7:
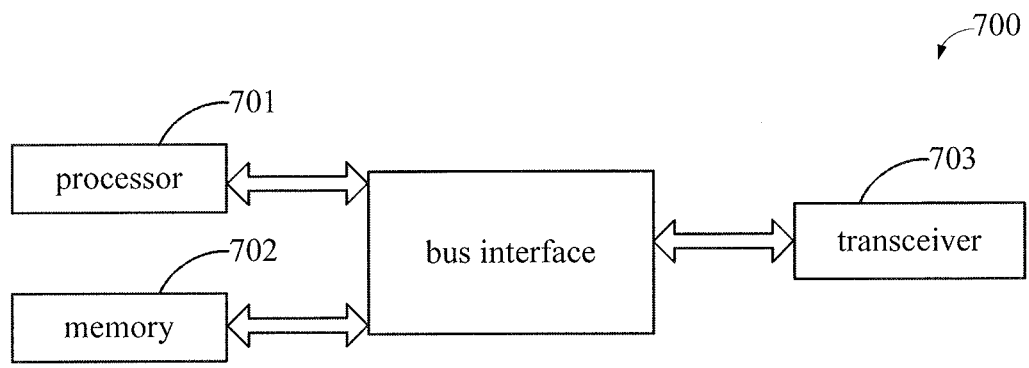
FIG. 7 is another schematic view showing the UE according to at least one embodiment of the present disclosure.

Referring to FIG. 7, the present disclosure further provides in some embodiments a UE 700 capable of executing the UCI transmission procedure at the UE side. The UE 700 may include a processor 701, a memory 702, a transceiver 703 and a bus interface.

The processor 701 may take charge of managing the bus architecture as well as general processing. The memory 702 may store therein data for the operation of the processor 701. The transceiver 703 may be configured to receive and transmit data under the control of the processor 701.

Bus architecture may include a number of buses and bridges connected to each other, so as to connect various circuits for one or more processors 701 and one or more memories 702. In addition, the bus architecture may be used to connect any other circuits, such as a circuit for a peripheral device, a circuit for a voltage stabilizer and a power management circuit. Bus interfaces are provided, and the transceiver 703 may consist of a plurality of elements, i.e., a transmitter and a receiver for communication with any other devices over a transmission medium.

The UCI transmission procedure at the UE side may be applied to, or implemented by, the processor 701. During the implementation, the steps in the UCI transmission procedure may be executed by an integrated logic circuit of hardware or software in the processor 701. The processor 701 may be a general-purpose processor, including a Central Processing Unit (CPU), a Network Processor (NP), a Digital Signal Processor (DSP), an Application Specific Integrated Circuit (ASIC), a Field Programmable Gate Array (FPGA), or any other programmable logic element, discrete gate or transistor logic element, or discrete hardware assembly, so as to implement or execute the method, the steps and the procedures. The general-purpose processor may be a microprocessor or any other conventional processor. The steps of the method in the embodiments of the present disclosure may be executed by the processor directly, or by the processor in combination with software modules. The software modules may be located in a known storage medium such as a Random Access Memory (RAM), a flash memory, a Read Only Memory (ROM), a Programmable Read Only Memory (PROM) or Electrically Erasable Programmable Read Only Memory (EEPROM), or a register. The storage medium may be located in the memory 702, and the processor 701 may read information stored in the memory 702, so as to implement the steps of the method in a control plane in combination with the hardware.

To be specific, the processor 701 is configured to read a program stored in the memory 702, so as to: determine a subframe set in which UCI repetition is to be transmitted, the UCI including an ACK/NACK and an SR; if the ACK/NACK and the SR are to be transmitted in a certain subframe, select one kind of the UCI from the ACK/NACK and the SR to be transmitted in the certain subframe in accordance with a UCI selection rule; and transmit the selected UCI in the certain subframe.

The UCI selection rule include one or more of the above-mentioned rules 1 to 5, which will not be particularly defined herein.

In a possible embodiment of the present disclosure, when selecting one kind of the UCI from the ACK/NACK and the SR in accordance with priority of the ACK, the NACK and the SR, the processor may be further configured to: if the ACK/NACK to be transmitted in the certain subframe is the ACK, select the ACK/NACK from the ACK/NACK and the SR to be transmitted in the certain subframe, and otherwise select the SR from the ACK/NACK and the SR to be transmitted in the certain subframe; or if the ACK/NACK to be transmitted in the certain subframe is the NACK, select the SR from the ACK/NACK and the SR to be transmitted in the certain subframe.

In a possible embodiment of the present disclosure, when selecting one kind of the UCI from the ACK/NACK and the SR in accordance with a type of the UCI repeated in subframes preceding the certain subframe, the processor may be further configured to configured to select, from the ACK/NACK and the SR to be transmitted in the certain subframe, the UCI of a type identical to the UCI repeated in subframe preceding the certain subframe.

In a possible embodiment of the present disclosure, when selecting one kind of the UCI from the ACK/NACK and the SR in accordance with a first number of transmission times and/or a second number of transmission times of the UCI, the processor may be further configured to: if a ratio of the first number of transmission times to the second number of transmission times of the UCI in subframe preceding the certain subframe is greater than a first threshold, select from the ACK/NACK and the SR to be transmitted in the certain subframe the UCI of a type identical to the UCI repeated in subframe preceding the certain subframe, and otherwise select from the ACK/NACK and the SR to be transmitted in the certain subframe the UCI of a type different from the UCI repeated in subframe preceding the certain subframe; or select the type of the UCI having a larger or smaller second number of transmission times in accordance with a second number of transmission times of the ACK/NACK and a second number of transmission times of the SR, and select from the ACK/NACK and the SR to be transmitted in the certain subframe the UCI of a type identical to the selected type of the UCI.

In a possible embodiment of the present disclosure, when selecting one kind of the UCI from the ACK/NACK and the SR in accordance with the first number of transmission times and/or the second number of transmission times of the UCI as well as the type of the UCI repeated in subframe preceding the certain subframe, the processor may be further configured to, if the UCI repeated in subframe preceding the certain subframe is the ACK and a ratio of the first number of transmission times of the ACK to the second number of transmission times of the ACK is greater than the first threshold, select the ACK/NACK from the ACK/NACK and the SR to be transmitted in the certain subframe, and otherwise select the SR from the ACK/NACK and the SR to be transmitted in the certain subframe.

In a possible embodiment of the present disclosure, when selecting one kind of the UCI from the ACK/NACK and the SR in accordance with the first number of transmission times and/or the second number of transmission times of the UCI as well as the priority of the ACK, the NACK and the SR, the processor may be further configured to, if the UCI repeated in subframe preceding the certain subframe is the SR and the ACK/NACK to be transmitted in the certain subframe is the ACK, select the ACK/NACK from the ACK/NACK and the SR to be transmitted in the certain subframe, and otherwise select from the ACK/NACK and the SR to be transmitted in the certain subframe the UCI of a type identical to the UCI repeated in subframe preceding the certain subframe.

In a possible embodiment of the present disclosure, when transmitting the selected UCI in the certain subframe, the processor may be further configured to: if the selected UCI is the ACK/NACK, transmit the ACK/NACK in the certain subframe using a PUCCH transmission scheme corresponding to the ACK/NACK on a PUCCH resource corresponding to the ACK/NACK; or if the selected UCI is the SR, transmit the SR in the certain subframe using a PUCCH transmission scheme corresponding to the SR on a PUCCH resource corresponding to the SR.

Figure 8:
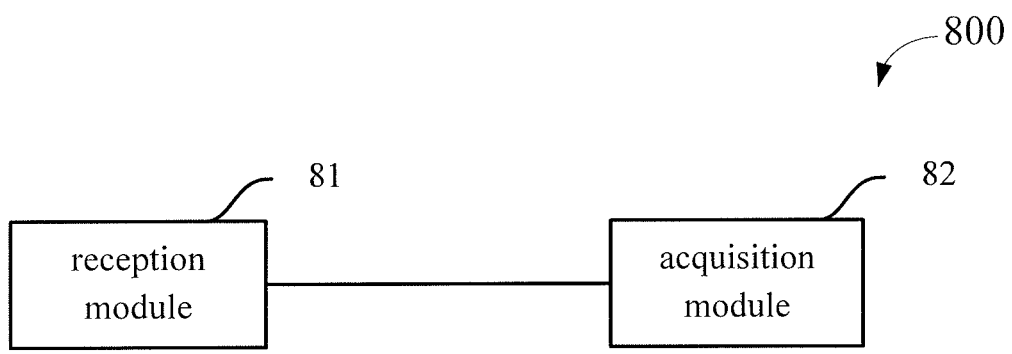
FIG. 8 is a schematic view showing a base station according to at least one embodiment of the present disclosure.

Referring to FIG. 8, the present disclosure further provides in some embodiments a base station 800 capable of executing the UCI transmission procedure at the base station side. The base station 800 may include a reception module 81 and an acquisition module 82. The reception module 81 is configured to receive subframes including a first substrate, the certain subframe being an ACK/NACK transmission subframe and an SR transmission subframe. UCI to be transmitted in the certain subframe includes one of an ACK/NACK and an SR in accordance with a UCI selection rule. The acquisition module 82 is configured to acquire the UCI from the ACK/NACK transmission subframe and/or the SR transmission subframe of the received subframes in accordance with the UCI selection rule used by a UE.

The UCI selection rule include one or more of the above-mentioned rules 1 to 5, which will not be particularly defined herein.

In a possible embodiment of the present disclosure, when selecting one kind of the UCI from the ACK/NACK and the SR in accordance with priority of the ACK, the NACK and the SR in rule 3, the acquisition module 82 may be further configured to: if the ACK/NACK to be transmitted in the certain subframe is the ACK, select the ACK/NACK from the ACK/NACK and the SR to be transmitted in the certain subframe, and otherwise select the SR from the ACK/NACK and the SR to be transmitted in the certain subframe; or in the case that the ACK/NACK to be transmitted in the certain subframe is the NACK, select the SR from the ACK/NACK and the SR to be transmitted in the certain subframe.

In a possible embodiment of the present disclosure, when selecting one kind of the UCI from the ACK/NACK and the SR in accordance with a type of the UCI repeated in subframe preceding the certain subframe in rule 4, the acquisition module 82 may be further configured to select, from the ACK/NACK and the SR to be transmitted in the certain subframe, the UCI of a type identical to the UCI repeated in subframe preceding the certain subframe.

In a possible embodiment of the present disclosure, when selecting one kind of the UCI from the ACK/NACK and the SR in accordance with a first number of transmission times and/or a second number of transmission times of the UCI in rule 5, the acquisition module 82 may be further configured: if a ratio of the first number of transmission times to the second number of transmission times of the UCI in subframe preceding the certain subframe is greater than a first threshold, select from the ACK/NACK and the SR to be transmitted in the certain subframe the UCI of a type identical to the UCI repeated in subframe preceding the certain subframe, and otherwise select from the ACK/NACK and the SR to be transmitted in the certain subframe the UCI of a type different from the UCI repeated in subframe preceding the certain subframe; or select the type of the UCI having a larger or smaller second number of transmission times in accordance with a second number of transmission times of the ACK/NACK and a second number of transmission times of the SR, and select from the ACK/NACK and the SR to be transmitted in the certain subframe the UCI of a type identical to the selected type of the UCI.

In a possible embodiment of the present disclosure, when both rules 4 and 5 are adopted, the acquisition module 82 may be further configured to, if the UCI repeated in subframe preceding the certain subframe is the ACK and a ratio of the first number of transmission times of the ACK to the second number of transmission times of the ACK is greater than the first threshold, select the ACK/NACK from the ACK/NACK and the SR to be transmitted in the certain subframe, and otherwise select the SR from the ACK/NACK and the SR to be transmitted in the certain subframe.

In a possible embodiment of the present disclosure, when both rules 4 and 3 are adopted, the acquisition module 82 may be further configured to, if the UCI repeated in subframe preceding the certain subframe is the SR and the ACK/NACK to be transmitted in the certain subframe is the ACK, select the ACK/NACK from the ACK/NACK and the SR to be transmitted in the certain subframe, and otherwise select from the ACK/NACK and the SR to be transmitted in the certain subframe the UCI of a type identical to the UCI repeated in subframe preceding the certain subframe.

In a possible embodiment of the present disclosure, if the UCI to be transmitted in the certain subframe is the ACK/NACK, the ACK/NACK is to be transmitted in the certain subframe using a Physical Uplink Control Channel (PUCCH) transmission scheme corresponding to the ACK/NACK on a PUCCH resource corresponding to the ACK/NACK; or if the UCI to be transmitted in the certain subframe is the SR, the SR is to be transmitted in the certain subframe using a PUCCH transmission scheme corresponding to the SR on a PUCCH resource corresponding to the SR.

Figure 9:
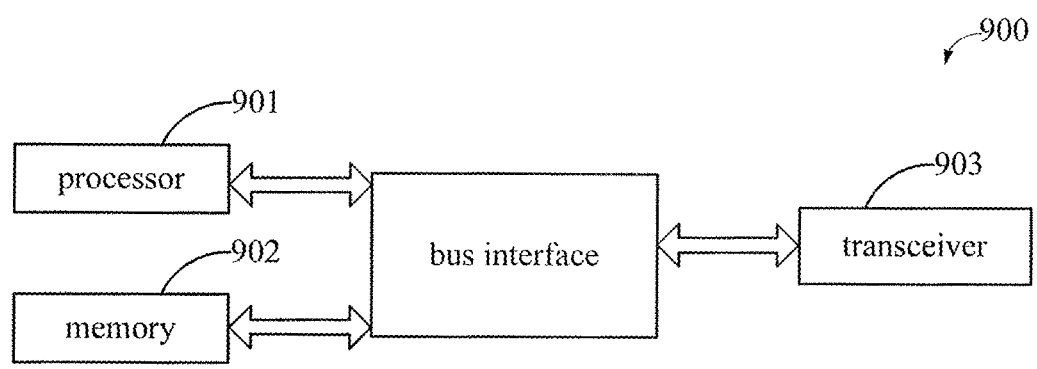
FIG. 9 is another schematic view showing the base station according to at least one embodiment of the present disclosure.

Referring to FIG. 9, the present disclosure further provides in some embodiments a base station 900 capable of executing the UCI transmission procedure at the base station side. The base station 900 may include a processor 901, a memory 902, a transceiver 903 and a bus interface.

The processor 901 may take charge of managing the bus architecture as well as general processings. The memory 902 may store therein data for the operation of the processor 901. The transceiver 903 may be configured to receive and transmit data under the control of the processor 901.

Bus architecture may include a number of buses and bridges connected to each other, so as to connect various circuits for one or more processors 901 and one or more memories 902. In addition, as is known in the art, the bus architecture may be used to connect any other circuits, such as a circuit for a peripheral device, a circuit for a voltage stabilizer and a power management circuit. Bus interfaces are provided, and the transceiver 903 may consist of a plurality of elements, i.e., a transmitter and a receiver for communication with any other devices over a transmission medium.

The UCI transmission procedure at the UE side may be applied to, or implemented by, the processor 901. During the implementation, the steps in the UCI transmission procedure may be executed by an integrated logic circuit of hardware or software in the processor 901. The processor 901 may be a general-purpose processor, including a CPU, an NP, a DSP, an ASIC, an FPGA, or any other programmable logic element, discrete gate or transistor logic element, or discrete hardware assembly, so as to implement or execute the method, the steps and the procedures. The general-purpose processor may be a microprocessor or any other conventional processor. The steps of the method in the embodiments of the present disclosure may be executed by the processor directly, or by the processor in combination with software modules. The software modules may be located in a known storage medium such as a RAM, a flash memory, a ROM, a PROM or EEPROM, or a register. The storage medium may be located in the memory 902, and the processor 901 may read information stored in the memory 902, so as to implement the steps of the method in a control plane in combination with the hardware.

To be specific, the processor 901 may be configured to read a program stored in the memory 902, so as to: receive subframes including a first substrate, the certain subframe being an ACK/NACK transmission subframe and an SR transmission subframe, UCI to be transmitted in the certain subframe including one of an ACK/NACK and an SR in accordance with a UCI selection rule; and acquire the UCI from the ACK/NACK transmission subframe and/or the SR transmission subframe of the received subframes in accordance with the UCI selection rule used by a UE.

The UCI selection rule include one or more of the above-mentioned rules 1 to 5, which will not be particularly defined herein.

In a possible embodiment of the present disclosure, when selecting one kind of the UCI from the ACK/NACK and the SR in accordance with priority of the ACK, the NACK and the SR in rule 3, the processor 901 may be further configured to: if the ACK/NACK to be transmitted in the certain subframe is the ACK, select the ACK/NACK from the ACK/NACK and the SR to be transmitted in the certain subframe, and otherwise select the SR from the ACK/NACK and the SR to be transmitted in the certain subframe; or if the ACK/NACK to be transmitted in the certain subframe is the NACK, select the SR from the ACK/NACK and the SR to be transmitted in the certain subframe.

In a possible embodiment of the present disclosure, when selecting one kind of the UCI from the ACK/NACK and the SR in accordance with a type of the UCI repeated in subframe preceding the certain subframe in rule 4, the processor 901 may be further configured to select, from the ACK/NACK and the SR to be transmitted in the certain subframe, the UCI of a type identical to the UCI repeated in subframe preceding the certain subframe.

In a possible embodiment of the present disclosure, when selecting one kind of the UCI from the ACK/NACK and the SR in accordance with a first number of transmission times and/or a second number of transmission times of the UCI, the processor 901 may be further configured: if a ratio of the first number of transmission times to the second number of transmission times of the UCI in subframe preceding the certain subframe is greater than a first threshold, select from the ACK/NACK and the SR to be transmitted in the certain subframe the UCI of a type identical to the UCI repeated in subframe preceding the certain subframe, and otherwise select from the ACK/NACK and the SR to be transmitted in the certain subframe the UCI of a type different from the UCI repeated in subframe preceding the certain subframe; or select the type of the UCI having a larger or smaller second number of transmission times in accordance with a second number of transmission times of the ACK/NACK and a second number of transmission times of the SR, and select from the ACK/NACK and the SR to be transmitted in the certain subframe the UCI of a type identical to the selected type of the UCI.

In a possible embodiment of the present disclosure, when both rules 4 and 5 are adopted, the processor 901 may be further configured to, if the UCI repeated in subframe preceding the certain subframe is the ACK and a ratio of the first number of transmission times of the ACK to the second number of transmission times of the ACK is greater than the first threshold, select the ACK/NACK from the ACK/NACK and the SR to be transmitted in the certain subframe, and otherwise select the SR from the ACK/NACK and the SR to be transmitted in the certain subframe.

In a possible embodiment of the present disclosure, in the case that both rules 4 and 3 are adopted, the processor 901 may be further configured to, if the UCI repeated in subframe preceding the certain subframe is the SR and the ACK/NACK to be transmitted in the certain subframe is the ACK, select the ACK/NACK from the ACK/NACK and the SR to be transmitted in the certain subframe, and otherwise select from the ACK/NACK and the SR to be transmitted in the certain subframe the UCI of a type identical to the UCI repeated in subframe preceding the certain subframe.

In a possible embodiment of the present disclosure, if the UCI to be transmitted in the certain subframe is the ACK/NACK, the ACK/NACK is to be transmitted in the certain subframe using a PUCCH transmission scheme corresponding to the ACK/NACK on a PUCCH resource corresponding to the ACK/NACK; or if the UCI to be transmitted in the certain subframe is the SR, the SR is to be transmitted in the certain subframe using a PUCCH transmission scheme corresponding to the SR on a PUCCH resource corresponding to the SR.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall in the scope of the present disclosure.

What is claimed is:

1. An Uplink Control Information (UCI) transmission method, comprising steps of:
    determining a subframe set in which UCI repetition is to be transmitted, the UCI comprising an ACKnowledgement/Non-ACKnowledgement (ACK/NACK) and a Scheduling Request (SR);
    in response to determining that the ACK/NACK and the SR are to be transmitted in a certain subframe in the subframe set, selecting one from the ACK/NACK and the SR to be transmitted in the certain subframe in accordance with a UCI selection rule; and transmitting the selected one in the certain subframe, wherein, for the ACK/NACK and the SR to be transmitted in the certain subframe, the other one which is not selected is discarded;

wherein the step of transmitting the selected one in the certain subframe comprises:

in response to determining that the selected one is the ACK/NACK, transmitting the ACK/NACK to be transmitted in the certain subframe using a Physical Uplink Control Channel (PUCCH) transmission scheme corresponding to the ACK/NACK on a PUCCH resource corresponding to the ACK/NACK in the certain subframe, wherein the PUCCH resource corresponding to the ACK/NACK in the certain subframe is an implicit PUCCH resource determined in accordance with a minimum Control Channel Element (CCE)/Enhanced-Control Channel Element (E-CCE) or a PUCCH resource preconfigured through high-layer signaling; or in response to determining that the selected one is the SR, transmitting the SR to be transmitted in the certain subframe using a PUCCH transmission scheme corresponding to the SR on, a PUCCH resource corresponding to the SR in the certain subframe, wherein the PUCCH resource corresponding to the SR in the certain subframe is a PUCCH resource preconfigured through high-layer signaling.

2. The UCI transmission method according to claim 1, wherein the UCI selection rule comprises one or more of:

a first rule of selecting the ACK/NACK from the ACK/NACK and the SR;

a second rule of selecting the SR from the ACK/NACK and the SR;

a third rule of selecting one from the ACK/NACK and the SR in accordance with priority of the ACID, the NACK and the SR;

a fourth rule of selecting one from the ACK/NACK and the SR in accordance with a type of the UCI repeated in a subframe preceding the certain subframe in the subframe set; and a fifth rule of selecting one from the ACK/NACK and the SR in accordance with a first number of transmission times and/or a second number of transmission times of the UCI, the first number of transmission times being a number of repetition transmission times of the UCI in subframe preceding the certain subframe in the subframe set, the second number of transmission times being a total number of repetition transmission times of the UCI.

3. The UCI transmission method according to claim 2, wherein the step of selecting one from the ACK/NACK and the SR in accordance with the priority of the ACK, the NACK and the SR comprises:

in response to determining that the ACK/LACK to be transmitted in the certain subframe is the ACK, selecting the ACK/NACK from the ACK/NACK and the SR to be transmitted in the certain subframe, and otherwise selecting the SR from the ACK/NACK and the SR to be transmitted in the certain subframe; or in response to determining that the ACK/NACK to be transmitted in the certain subframe is the NACK, selecting the SR from the ACK/NACK and the SR to be transmitted in the certain subframe.

4. The UCI transmission method according to claim 2, wherein the step of selecting one from the ACK/NACK and the SR in accordance with the type of the UCI repeated in subframe preceding the certain subframe in the subframe set comprises selecting, from the ACK/NACK and the SR to be transmitted in the certain subframe, the UCI of a type identical to the UCI repeated in the subframe preceding the certain subframe.

5. The UCI transmission method according to claim 2, wherein the step of selecting one from the ACK/NACK and the SR in accordance with the first number of transmission times and/or the second number of transmission times of the UCI comprises:

in response to determining that a ratio of the first number of transmission times to the second number of transmission times of the UCI repeated in subframe preceding the certain subframe is greater than a first threshold, selecting from the ACK/NACK and the SR to be transmitted in the certain subframe the UCI of a type identical to the UCI repeated in subframe preceding the certain subframe, and otherwise selecting from the ACK/NACK and the SR to be transmitted in the certain subframe the UCI of a type different from the UCI repeated in subframe preceding the certain subframe; or selecting the type of the UCI having a larger or smaller second number of transmission, times in accordance with a second number of transmission times of the ACK/NACK and a second number of transmission times of the SR, and selecting from the ACK/NACK and the SR to be transmitted in the certain subframe the UCI of a type identical to the selected type of the UCI.

6. The UCI transmission method according to claim 2, wherein the step of selecting one from the ACK/NACK and the SR in accordance with the first number of transmission times and/or the second number of transmission times of the UCI and the type of the UCI repeated in subframe preceding the certain subframe comprises, in response to determining that the UCI repeated in subframe preceding the certain subframe is the ACK and a ratio of the first number of transmission times of the ACK to the second number of transmission times of the ACK is greater than the first threshold, selecting the ACK/NACK from the ACK/NACK and the SR to be transmitted in the certain subframe, and otherwise selecting the SR from the ACK/NACK and the SR to be transmitted in the certain subframe.

7. The UCI transmission method according to claim 2, wherein the step of selecting one from the ACK/NACK and the SR in accordance with the type of the UCI repeated in subframe preceding the certain subframe and the priority of the ACK, the NACK and the SR comprises: in response to determining that the UCI repeated in subframe preceding the certain subframe is the SR and the ACK/NACK to be transmitted in the certain subframe is the ACK, selecting the ACK NACK from the ACK/NACK and the SR to be transmitted in the certain subframe, and otherwise selecting from the ACK/NACK and the SR to be transmitted in the certain subframe the UCI of a type identical to the UCI repeated in subframe preceding the certain subframe.

8. The UCI transmission method according to claim 1, wherein a PUCCH transmission resource of the certain subframe comprises a first resource and a second resource, the first resource is the PUCCH resource corresponding to the ACK/NACK, and the second resource is the PUCCH resource corresponding to the SR.

9. An Uplink Control Information (UCI) transmission method, comprising steps of:

receiving a subframe set comprising a certain subframe, the certain subframe being an ACKnowledgement/Non-ACKnowledgement (ACK/NACK) transmission subframe and a Scheduling Request (SR) transmission subframe, wherein one selected from an ACK/NACK and an SR in accordance with a UCI selection rule is to be transmitted in the certain subframe, and wherein, for the ACK/NACK and the SR, the other one which is not selected, is discarded in the certain subframe; and acquiring the UCI from the ACK/NACK transmission subframe and/or the SR transmission subframe of the received subframe set in accordance with the UCI selection rule used by a User Equipment (UE);

wherein in response to determining that the selected one to be transmitted in the certain subframe is the ACK/NACK, the ACK/NACK is to be transmitted in the certain subframe using a Physical Uplink Control Channel (PUCCH) transmission scheme corresponding to the ACK/NACK on a PUCCH resource corresponding to the ACK/NACK in the certain subframe, the PUCCH resource corresponding to the ACK/NACK in the certain subframe is an implicit PUCCH resource determined in accordance with a minimum Control Channel Element (CCE)/Enhanced-Control Channel Element (E-CCE) or a PUCCH resource preconfigured through high-layer signaling; or in response to determining that the selected one to be transmitted in the certain subframe is the SR, the SR is to be transmitted in the certain subframe using a PUCCH transmission scheme corresponding to the SR on a PUCCH resource corresponding to the SR in the certain subframe, the PUCCH resource corresponding to the SR in the certain subframe is a PUCCH resource preconfigured through high-layer signaling.

10. The UCI transmission method according to claim 9, wherein the UCI selection rule comprises one or more of:
   a first rule of selecting the ACK/NACK from the ACK/NACK and the SR;
   a second rule of selecting the SR from the ACK/NACK and the SR;
   a third rule of selecting one from the ACK/NACK and the SR in accordance with priority of the ACK, the NACK and the SR;
   a fourth rule of selecting one from the ACK/NACK and the SR in accordance with a type of the UCI repeated in a subframe preceding the certain subframe in the subframe set; and
   a fifth rule of selecting one from the ACK/NACK and the SR in accordance with a first number of transmission times and/or a second number of transmission times of the UCI, the first number of transmission times being, a number of repetition transmission times of the UCI in subframe preceding the certain subframe in the subframe set, the second number of transmission times being a total number of repetition transmission times of the UCI.

11. The UCI transmission method according to claim 10, wherein the step of selecting one from the ACK/NACK and the SR in accordance with, the priority of the ACK, the NACK and the SR comprises:
   in response to determining that the ACK/NACK to be transmitted in the certain subframe is the ACK, selecting the ACK/NACK from the ACK/NACK and the SR to be transmitted in the certain subframe, and otherwise selecting the SR from the ACK/NACK and the SR to be transmitted in the certain subframe; or
   in response to determining that the ACK/NACK to be transmitted in the certain subframe is the NACK, selecting the SR from the ACK/NACK and the SR to be transmitted in the certain subframe,
wherein the step of selecting one from the ACK/NACK and the SR in accordance with the type of the UCI repeated in subframe preceding the certain subframe comprises selecting, from the ACK/NACK and the SR to be transmitted in the certain subframe, the UCI of a type identical to the UCI repeated in subframe preceding the certain subframe, wherein the step of selecting one from the ACK/NACK and the SR in accordance with the first number of transmission times and/or the second number of transmission times of the UCI comprises:
   in response to determining that a ratio of the first number of transmission times to the second number of transmission times of the UCI in subframe preceding the certain subframe is greater than a first threshold, selecting from the ACK/NACK and the SR to be transmitted in the certain subframe the UCI of a type identical to the UCI repeated in subframe preceding the certain subframe, and otherwise selecting from the ACK/NACK and the SR to be transmitted in the certain subframe the UCI of a type different from the UCI repeated in subframe preceding the certain subframe; or
   selecting the type of the UCI having a larger or smaller second number of transmission, times in accordance with a second number of transmission times of the ACK/NACK and a second number of transmission times of the SR, and selecting from the ACK/NACK and the SR to be transmitted in the certain subframe the UCI of a type identical to the selected type of the UCI, wherein the step of selecting one from the ACK/NACK and the SR in accordance with the first number of transmission times and/or the second number of transmission times of the UCI and the type of the UCI repeated in subframe preceding the certain subframe comprises, in response to determining that the UCI repeated in subframe preceding the certain subframe is the ACK and a ratio of the first number of transmission times of the ACK to the second number of transmission times of the ACK is greater than the first threshold, selecting the ACK/NACK from the ACK/NACK and the SR to be transmitted in the certain subframe, and otherwise selecting the SR from the ACK/NACK and the SR to be transmitted in the certain subframe, wherein the step of selecting one from the ACK/NACK and the SR in accordance with the type of the UCI repeated in subframe preceding, the certain subframe and the priority of the ACK, the NACK and the SR comprises: in response to determining that, the UCI repeated in subframe preceding the certain subframe is the SR and the ACK/NACK to be transmitted in the certain subframe is the ACK, selecting the ACK/NACK from the ACK/NACK and the SR to be transmitted in the certain subframe, and otherwise selecting from the ACK/NACK and the SR to be transmitted in the certain subframe the UCI of a type identical to the UCI repeated in subframe preceding the certain subframe.

12. A User Equipment (UE), comprising a processor, a memory and a transceiver, wherein the processor is configured to read a program stored in the memory, so as to:
   determine a subframe set in which UCI repetition is to be transmitted, the UCI comprising an ACKnowledgement/Non-Acknowledgement (ACK/NACK) and a Scheduling Request (SR);
   when the ACK/NACK and the SR are to be transmitted in a certain subframe in the subframe set, select one from the ACK/NACK and the SR to be transmitted in the certain subframe in accordance with a UCI selection rule; and transmit the selected one in the certain subframe, wherein, for the ACK/NACK and the SR to be transmitted in the certain subframe, the other one which is not selected is discarded,
wherein the transceiver is configured to receive and transmit data, and
wherein the processor is configured to manage bus architecture as well as general processing, and the memory is configured to store therein data for the operation of the processor;
wherein transmitting the selected one in the certain subframe comprises:
when the selected one is the ACK/NACK, transmitting, the ACK/NACK to be transmitted in the certain subframe using a Physical Uplink Control Channel (PUCCH) transmission scheme corresponding to the ACK/NACK on a PUCCH resource corresponding to the ACK/NACK in the certain subframe, wherein the PUCCH resource corresponding to the ACK/NACK in the certain subframe is an implicit PUCCH resource determined in accordance with a minimum Control Channel Element (CCE)/Enhanced-Control Channel Element (E-CCE) or a PUCCH resource preconfigured through high-layer signaling; or when the selected one is the SR, transmitting the SR to be transmitted in the certain subframe using a PUCCH transmission scheme corresponding to the SR on a PUCCH resource corresponding to the SR in the certain subframe, wherein the PUCCH resource corresponding to the SR in the certain subframe is a PUCCH resource preconfigured through high-layer signaling.

13. The UE according to claim 12, wherein the UCI selection rule comprises one or more of:
a first rule of selecting the ACK/NACK from the ACK/NACK and the SR;
a second rule of selecting the SR from the ACK/NACK and the SR;
a third rule of selecting one from the ACK/NACK and the SR in accordance with priority of the ACK, the NACK and the SR;
a fourth rule of selecting one from the ACK/NACK and the SR in accordance with a type of the UCI repeated in a subframe preceding the certain subframe in the subframe set; and
a fifth rule of selecting one from the ACK/NACK and the SR in accordance with a first number of transmission times and/or a second number of transmission times of the UCI, the first number of transmission times being a number of repetition transmission times of the UCI in subframe preceding, the certain subframe in the subframe set, the second number of transmission times being a total number of repetition transmission times of the UCI.

14. The UE according to claim 13, wherein the step of selecting one from the ACK/NACK and the SR in accordance with the priority of the ACK, the NACK and the SR comprises:
when the ACK/NACK to be transmitted in the certain subframe is the ACK, selecting the ACK/NACK from the ACK/NACK and the SR to be transmitted in the certain subframe, and otherwise selecting the SR from the ACK/NACK and the SR to be transmitted in the certain subframe; or
when the ACK/NACK to be transmitted in the certain subframe is the NACK, selecting the SR from the ACK/NACK and the SR to be transmitted in the certain subframe,
wherein the step of selecting one from the ACK/NACK and the SR in accordance with the type of the UCI repeated in subframe preceding the certain subframe in the subframe set comprises selecting, from the ACK/NACK and the SR to be transmitted in the certain subframe, the UCI of a type identical to the UCI repeated in the subframe preceding the certain subframe,
wherein the step of selecting one from the ACK/NACK and the SR in accordance with the first number of transmission times and/or the second number of transmission times of the UCI comprises:
when a ratio of the first number of transmission times to the second number of transmission times of the UCI repeated in subframe preceding the certain subframe is greater than a first threshold, selecting from the ACK/NACK and the SR to be transmitted in the certain subframe the UCI of a type identical to the UCI repeated in subframe preceding the certain subframe, and otherwise selecting from the ACK/NACK and the SR to be transmitted in the certain subframe the UCI of a type different from the UCI repeated in subframe preceding the certain subframe; or
selecting the type of the UCI having a larger or smaller second number of transmission times in accordance with a second number of transmission times of the ACK/NACK and a second number of transmission times of the SR, and selecting from the ACK/NACK and the SR to be transmitted in the certain subframe the UCI of a type identical to the selected type of the UCI,
wherein the step of selecting one from the ACK/NACK and the SR in accordance with the first number of transmission times and/or the second number of transmission times of the UCI and the type of the UCI repeated in subframe preceding the certain subframe comprises, when the UCI repeated in subframe preceding the certain subframe is the ACK and a ratio of the first number of transmission times of the ACK to the second number of transmission times of the ACK is greater than the first threshold, selecting the ACK/NACK from the ACK/NACK and the SR to be transmitted in the certain subframe, and otherwise selecting the SR from the ACK/NACK and the SR to be transmitted in the certain subframe,
wherein the step of selecting one from the ACK/NACK and the SR in accordance with the type of the UCI repeated in subframe preceding the certain subframe and the priority of the ACK, the NACK and the SR comprises: when the UCI repeated subframe preceding the certain subframe is the SR and the ACK/NACK to be transmitted in the certain subframe is the ACK, selecting the ACK/NACK from the ACK/NACK and the SR to be transmitted in the certain subframe, and otherwise selecting from the ACK/NACK and the SR to be transmitted in the certain subframe the UCI of a type identical to the UCI repeated in subframe preceding the certain subframe.

15. A base station, comprising a processor, a memory and a transceiver, wherein the processor is configured to read a program stored in the memory, so as to:
receive a subframe set comprising, a certain subframe, the certain subframe being an ACKnowledgement/Non-ACKnowledgement (ACK/NACK) transmission subframe and a Scheduling Request (SR) transmission subframe, wherein one selected from an ACK/NACK and an SR in accordance with a UCI selection rule is to be transmitted in the certain subframe, and wherein, for the ACK/NACK and the SR, the other one which is not selected is discarded in the certain subframe; and acquire the UCI from the ACK/NACK transmission subframe and/or the SR transmission subframe of the received subframes in accordance with the UCI selection rule used by a User Equipment (UE), wherein the transceiver is configured to receive and transmit data, and wherein the processor is configured to manage bus architecture as well as general processing, and the memory is configured to store therein data for the operation of the processor;

wherein when the selected one to be transmitted in the certain subframe is the ACK/NACK, the ACK/NACK is to be transmitted in the certain subframe using a Physical Uplink Control Channel (PUCCH) transmission scheme corresponding to the ACK/NACK on a PUCCH resource corresponding to the ACK/NACK in the certain subframe, the PUCCH resource corresponding to the ACK/NACK in the certain subframe is an implicit PUCCH resource determined in accordance with a minimum Control Channel Element (CCE)/Enhanced-Control Channel Element (E-CCE) or a PUCCH resource preconfigured through high-layer signaling; or when the selected one to be transmitted in the certain subframe is the SR, the SR is to be transmitted in the certain subframe using a PUCCH transmission scheme corresponding to the SR on a PUCCH resource corresponding to the SR in the certain subframe, the PUCCH resource corresponding to the SR in the certain subframe is a PUCCH resource preconfigured through high-layer signaling.

16. The base station according to claim 15, wherein the UCI selection rule comprises one or more of:
a first rule of selecting the ACK/NACK from the ACK/NACK and the SR;
a second rule of selecting the SR from the ACK/NACK and the SR;
a third rule of selecting one from the ACK/NACK and the SR in accordance with priority of the ACK, the NACK and the SR;
a fourth rule of selecting one from the ACK/NACK and the SR in accordance with a type of the UCI repeated in a subframe preceding the certain subframe in the subframe set; and
a fifth rule of selecting one from the ACK/NACK and the SR in accordance with a first number of transmission times and/or a second number of transmission times of the UCI, the first number of transmission times being a number of repetition transmission times of the UCI in subframe preceding the certain subframe in the subframe set, the second number of transmission times being a total number of repetition transmission times of the UCI.

17. The base station according to claim 16, wherein the step of selecting one from the ACK/NACK and the SR in accordance with the priority of the ACK, the NACK and the SR comprises:
when the ACK/NACK to be transmitted in the certain subframe is the ACK, selecting the ACK/NACK from the ACK/NACK and the SR to be transmitted in the certain subframe, and otherwise selecting the SR from the ACK/NACK and the SR to be transmitted in the certain subframe; or when the ACK/NACK to be transmitted in the certain subframe is the NACK, selecting the SR from the ACK/NACK and the SR to be transmitted in the certain subframe, wherein the step of selecting one from the ACK/NACK and the SR in accordance with the type of the UCI repeated in subframe preceding the certain subframe comprises selecting, from the ACK/NACK and the SR to be transmitted in the certain subframe, the UCI of a type identical to the UCI repeated in subframe preceding the certain subframe, wherein the step of selecting one from the ACK/NACK and the SR in accordance with the first number of transmission times and/or the second number of transmission times of the UCI comprises:

when a ratio of the first number of transmission times to the second number of transmission, times of the UCI in subframe preceding the certain subframe is greater than a first threshold, selecting from the ACK/NACK and the SR to be transmitted in the certain subframe the UCI of a type identical to the UCI repeated in subframe preceding the certain subframe, and otherwise selecting from the ACK/NACK and the SR to be transmitted in the certain subframe the UCI of a type different from the UCI repeated in subframe preceding the certain subframe; or selecting the type of the UCI having a larger or smaller second number of transmission times in accordance with a second number of transmission times of the ACK/NACK and a second number of transmission times of the SR, and selecting from the ACK/NACK and the SR to be transmitted in the certain subframe the UCI of a type identical to the selected type of the UCI, wherein the step of selecting one from the ACK/NACK and the SR in accordance with the first number of transmission times and/or the second number of transmission times of the UCI and the type of the UCI repeated in subframe preceding the certain subframe comprises, when the UCI repeated in subframe preceding the certain subframe is the ACK and a ratio of the first number of transmission times of the ACK to the second number of transmission times of the ACK is greater than the first threshold, selecting the ACK/NACK from the ACK/NACK and the SR to be transmitted in the certain subframe, and otherwise selecting the SR from the ACK/NACK and the SR to be transmitted in the certain subframe, wherein the step of selecting one from the ACK/NACK and the SR in accordance with the type of the UCI repeated in subframe preceding the certain subframe and the priority of the ACK, the NACK and the SR comprises: when the UCI repeated in subframe preceding the certain subframe is the SR and the ACK/NACK to be transmitted in the certain subframe is the ACK, selecting the ACK/NACK from the ACK/NACK and the SR to be transmitted in the certain subframe, and otherwise selecting from the ACK/NACK and the SR to be transmitted in the certain subframe the UCI of a type identical to the UCI repeated in subframe preceding the certain subframe.

* * * * *